(12) United States Patent
Frechen et al.

(10) Patent No.: US 11,398,992 B1
(45) Date of Patent: Jul. 26, 2022

(54) METHOD AND APPARATUS FOR PARSING AND DIFFERENTLY PROCESSING DIFFERENT PORTIONS OF A REQUEST

(71) Applicant: McKesson Corporation, Irving, TX (US)

(72) Inventors: Melissa Frechen, Atlanta, GA (US); Patrick Harris, Brookhaven, GA (US); Jessica Russell, Woodstock, GA (US); Allan Marks, Alpharetta, GA (US)

(73) Assignee: MCKESSON CORPORATION, Irving, TX (US)

( * ) Notice: Subject to any disclaimer, the term of this patent is extended or adjusted under 35 U.S.C. 154(b) by 0 days.

(21) Appl. No.: 17/219,526

(22) Filed: Mar. 31, 2021

Related U.S. Application Data

(63) Continuation of application No. 15/925,011, filed on Mar. 19, 2018, now Pat. No. 10,999,224, which is a continuation-in-part of application No. 15/422,184, filed on Feb. 1, 2017, now Pat. No. 10,924,585.

(51) Int. Cl.
*H04L 12/58* (2006.01)
*H04L 51/04* (2022.01)
*H04L 51/226* (2022.01)

(52) U.S. Cl.
CPC ........... *H04L 51/04* (2013.01); *H04L 51/226* (2022.05)

(58) Field of Classification Search
CPC ................................ H04L 51/04; H04L 51/26
See application file for complete search history.

(56) References Cited

U.S. PATENT DOCUMENTS

| 5,012,035 A | 4/1991 | Sartori et al. |
| 5,173,851 A | 12/1992 | Off et al. |
| 5,628,530 A | 5/1997 | Thornton |

(Continued)

FOREIGN PATENT DOCUMENTS

| AU | 2003243327 A | 12/2003 |
| CA | 2 482 370 A1 | 3/2006 |

(Continued)

OTHER PUBLICATIONS

U.S. Appl. No. 15/925,011, filed Mar. 19, 2018, U.S. Pat. No. 10,999,224, Patented.

(Continued)

*Primary Examiner* — Nicholas P Celani
(74) *Attorney, Agent, or Firm* — Alston & Bird LLP

(57) ABSTRACT

A method, apparatus and computer program product modify messaging behavior based upon parsing and different processing of different portions of a request. In a method, a request is received that includes a first and second differently formatted portions. The method parses the request to separately identify the first and second portions, analyzes the second portion of the request and causes a message based at least in part upon the first portion to be transmitted to a request processor. Based upon the message including the first portion, the method receives a response from the request processor. Based upon the response from the claims processor, the method causes a response to the request to be provided. The message to the request processor or the response to request is modified or an additional message to another entity is transmitted based upon an analysis of the second portion of the request.

20 Claims, 8 Drawing Sheets

(56) References Cited

U.S. PATENT DOCUMENTS

| | | |
|---|---|---|
| 5,595,342 A | 12/1997 | McNair et al. |
| 5,726,092 A | 3/1998 | Mathews et al. |
| 5,757,898 A | 5/1998 | Nishikawa |
| 5,769,228 A | 6/1998 | Wroblewski |
| 6,012,035 A | 1/2000 | Freeman et al. |
| 6,111,218 A | 8/2000 | Akers et al. |
| 6,463,462 B1 | 10/2002 | Smith et al. |
| 6,595,342 B1 | 7/2003 | Maritzen et al. |
| 6,726,092 B2 | 4/2004 | Goldberg et al. |
| 6,757,898 B1 | 6/2004 | Ilsen et al. |
| 6,769,228 B1 | 8/2004 | Mahar |
| 7,155,397 B2 | 12/2006 | Alexander et al. |
| 7,192,741 B2 | 3/2007 | Otte et al. |
| 7,337,129 B1 | 2/2008 | Lowry et al. |
| 7,346,768 B2 | 3/2008 | DiRienzo |
| 7,409,632 B1 | 8/2008 | DiRienzo |
| 7,734,483 B1 | 6/2010 | Smith et al. |
| 7,783,383 B2 | 8/2010 | Eliuk et al. |
| 7,840,424 B2 | 11/2010 | Wiley et al. |
| 7,856,364 B1 | 12/2010 | Wiley et al. |
| 7,912,741 B1 | 3/2011 | Pinsonneault |
| 7,921,021 B1 | 4/2011 | Newman |
| 8,036,913 B1 | 10/2011 | Pinsonneault et al. |
| 8,036,914 B1 | 10/2011 | Pinsonneault |
| 8,036,918 B1 | 10/2011 | Pinsonneault |
| 8,050,943 B1 | 11/2011 | Wiley et al. |
| 8,060,379 B1 | 11/2011 | Pinsonneault et al. |
| 8,326,773 B1 | 12/2012 | Bellamy |
| 8,412,537 B1 | 4/2013 | Fenton et al. |
| 8,489,415 B1 | 7/2013 | Ringold |
| 8,521,557 B1 | 8/2013 | Ringold et al. |
| 8,560,340 B1 | 10/2013 | Ringold |
| 8,645,162 B2 | 2/2014 | Boerger et al. |
| 8,671,018 B2 | 3/2014 | Thomas et al. |
| 8,738,399 B1 * | 5/2014 | Abou Nader .......... G16H 20/10 705/2 |
| 8,786,650 B1 | 7/2014 | Eller et al. |
| 8,984,059 B2 | 3/2015 | Johnson |
| 9,026,507 B2 | 5/2015 | Shraim et al. |
| 9,100,793 B2 | 8/2015 | Johnson |
| 9,171,322 B2 | 10/2015 | Spievak et al. |
| 9,356,947 B2 | 5/2016 | Shraim et al. |
| 10,157,262 B1 | 12/2018 | Pinsonneault |
| 10,417,380 B1 | 9/2019 | Kaye et al. |
| 10,489,552 B2 | 11/2019 | Pinsonneault |
| 10,496,793 B1 | 12/2019 | Lawrence et al. |
| 10,565,656 B1 | 2/2020 | Pinsonneault et al. |
| 10,606,984 B1 | 3/2020 | Kaye et al. |
| 10,616,146 B1 | 4/2020 | Hopkins et al. |
| 10,628,797 B2 | 4/2020 | Shraim et al. |
| 10,642,812 B1 | 5/2020 | Hopkins et al. |
| 10,713,694 B1 | 7/2020 | Harris et al. |
| 10,747,848 B2 | 8/2020 | Guinan |
| 10,778,618 B2 | 9/2020 | Karnin et al. |
| 10,862,832 B1 | 12/2020 | Harris |
| 10,924,545 B2 | 2/2021 | Momchilov et al. |
| 10,924,585 B1 | 2/2021 | Harris et al. |
| 10,929,932 B1 | 2/2021 | Golden et al. |
| 10,978,198 B1 | 4/2021 | Pinsonneault |
| 10,999,224 B1 | 5/2021 | Frechen et al. |
| 2001/0029483 A1 | 10/2001 | Schultz et al. |
| 2001/0037216 A1 | 11/2001 | Oscar et al. |
| 2001/0039589 A1 | 11/2001 | Aho et al. |
| 2001/0056359 A1 | 12/2001 | Abreu |
| 2002/0002495 A1 | 1/2002 | Ullman |
| 2002/0004812 A1 | 1/2002 | Motoyama |
| 2002/0032582 A1 | 3/2002 | Feeney et al. |
| 2002/0032583 A1 | 3/2002 | Joao |
| 2002/0035484 A1 | 3/2002 | McCormick |
| 2002/0087583 A1 | 7/2002 | Morgan et al. |
| 2002/0111832 A1 | 8/2002 | Judge |
| 2002/0147614 A1 | 10/2002 | Doerr et al. |
| 2002/0198831 A1 | 12/2002 | Patricelli et al. |
| 2003/0009367 A1 | 1/2003 | Morrison |
| 2003/0050796 A1 | 3/2003 | Baldwin |
| 2003/0050799 A1 | 3/2003 | Jay et al. |
| 2003/0069760 A1 | 4/2003 | Gelber |
| 2003/0074234 A1 | 4/2003 | Stasny |
| 2003/0097310 A1 | 5/2003 | Ono et al. |
| 2003/0149625 A1 | 8/2003 | Leonardi et al. |
| 2003/0154163 A1 | 8/2003 | Phillips et al. |
| 2003/0172008 A1 | 9/2003 | Hage et al. |
| 2003/0187690 A1 | 10/2003 | Miller |
| 2003/0229540 A1 | 12/2003 | Algiene |
| 2003/0236747 A1 | 12/2003 | Sager |
| 2004/0039599 A1 | 2/2004 | Fralic |
| 2004/0054685 A1 | 3/2004 | Rahn et al. |
| 2004/0059607 A1 | 3/2004 | Ball et al. |
| 2004/0073456 A1 | 4/2004 | Gottlieb et al. |
| 2004/0073457 A1 | 4/2004 | Kalies |
| 2004/0078222 A1 | 4/2004 | Khan et al. |
| 2004/0078234 A1 | 4/2004 | Tallal, Jr. |
| 2004/0088187 A1 | 5/2004 | Chudy et al. |
| 2004/0103062 A1 | 5/2004 | Wood et al. |
| 2004/0117323 A1 | 6/2004 | Mindala |
| 2004/0148198 A1 | 7/2004 | Kalies |
| 2004/0153336 A1 | 8/2004 | Virdee et al. |
| 2004/0199545 A1 | 10/2004 | Wagner et al. |
| 2004/0236630 A1 | 11/2004 | Kost et al. |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0075932 A1 | 4/2005 | Mankoff |
| 2005/0080692 A1 | 4/2005 | Padam et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240442 A1 | 10/2005 | Lapsker et al. |
| 2005/0240473 A1 | 10/2005 | Ayers, Jr. et al. |
| 2005/0261939 A1 | 11/2005 | Augspurger et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0036470 A1 | 2/2006 | Oaks |
| 2006/0085231 A1 | 4/2006 | Brofman |
| 2006/0085385 A1 | 4/2006 | Foster et al. |
| 2006/0113376 A1 | 6/2006 | Reed et al. |
| 2006/0149595 A1 | 7/2006 | Williams et al. |
| 2006/0149784 A1 | 7/2006 | Tholl et al. |
| 2006/0184391 A1 | 8/2006 | Barre et al. |
| 2006/0212318 A1 | 9/2006 | Dooley |
| 2006/0212345 A1 | 9/2006 | Soza et al. |
| 2006/0224414 A1 | 10/2006 | Astrup et al. |
| 2006/0224417 A1 | 10/2006 | Werner |
| 2006/0224443 A1 | 10/2006 | Soza et al. |
| 2006/0235747 A1 | 10/2006 | Hammond et al. |
| 2006/0259363 A1 | 11/2006 | Jhetam et al. |
| 2007/0005402 A1 | 1/2007 | Kennedy et al. |
| 2007/0033137 A1 | 2/2007 | Provost et al. |
| 2007/0043589 A1 | 2/2007 | Warren et al. |
| 2007/0043595 A1 | 2/2007 | Pederson |
| 2007/0050209 A1 | 3/2007 | Yered |
| 2007/0067186 A1 | 3/2007 | Brenner et al. |
| 2007/0094133 A1 | 4/2007 | Anandarao et al. |
| 2007/0108053 A1 | 5/2007 | Cramer et al. |
| 2007/0136100 A1 | 6/2007 | Daugherty et al. |
| 2007/0162303 A1 | 7/2007 | Wiley et al. |
| 2007/0185799 A1 | 8/2007 | Harrison et al. |
| 2007/0191985 A1 | 8/2007 | Bain |
| 2007/0194352 A1 | 8/2007 | Han |
| 2007/0202886 A1 | 8/2007 | Dhebri et al. |
| 2007/0204043 A1 | 8/2007 | Espinosa et al. |
| 2007/0219813 A1 | 9/2007 | Moore |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0250341 A1 | 10/2007 | Howe et al. |
| 2007/0260750 A1 | 11/2007 | Feied et al. |
| 2007/0276697 A1 | 11/2007 | Wiley et al. |
| 2007/0294765 A1 | 12/2007 | Rihn et al. |
| 2007/0299915 A1 | 12/2007 | Shraim et al. |
| 2008/0033750 A1 | 2/2008 | Swiss et al. |
| 2008/0103836 A1 | 5/2008 | Park et al. |

(56) References Cited

U.S. PATENT DOCUMENTS

| | | |
|---|---|---|
| 2008/0112411 A1 | 5/2008 | Stafford et al. |
| 2008/0152107 A1 | 6/2008 | Mendiola |
| 2008/0215361 A1 | 9/2008 | Nunnari et al. |
| 2008/0262948 A1 | 10/2008 | Grady et al. |
| 2009/0030719 A1 | 1/2009 | Nadas et al. |
| 2009/0064330 A1 | 3/2009 | Shraim et al. |
| 2009/0094051 A1 | 4/2009 | Ard et al. |
| 2009/0100099 A1 | 4/2009 | Buckwalter |
| 2009/0112707 A1 | 4/2009 | Weiss et al. |
| 2009/0204477 A1 | 8/2009 | Urso |
| 2009/0287558 A1 | 11/2009 | Seth et al. |
| 2009/0313112 A1 | 12/2009 | Champ et al. |
| 2009/0327363 A1 | 12/2009 | Cullen et al. |
| 2010/0030667 A1 | 2/2010 | Chudy et al. |
| 2010/0070298 A1 | 3/2010 | Kalies |
| 2010/0144259 A1 | 6/2010 | Allexon et al. |
| 2010/0145730 A1 | 6/2010 | Abreu |
| 2010/0161353 A1 | 6/2010 | Mayaud |
| 2010/0217622 A1 | 8/2010 | Brown et al. |
| 2010/0285821 A1 | 11/2010 | Smeeding et al. |
| 2010/0293236 A1 | 11/2010 | Wisner et al. |
| 2011/0112871 A1* | 5/2011 | Simonowski .......... G06Q 40/02 705/4 |
| 2011/0161109 A1 | 6/2011 | Pinsonneault et al. |
| 2011/0196697 A1 | 8/2011 | Akers |
| 2011/0288925 A1 | 11/2011 | Thomas et al. |
| 2012/0053958 A1 | 3/2012 | Marshall et al. |
| 2012/0136809 A1 | 5/2012 | Cannata et al. |
| 2012/0143627 A1 | 6/2012 | Ruben et al. |
| 2012/0166268 A1 | 6/2012 | Griffiths |
| 2012/0179481 A1 | 7/2012 | Patel et al. |
| 2012/0185263 A1 | 7/2012 | Emert |
| 2012/0185264 A1 | 7/2012 | Demogenes et al. |
| 2012/0253829 A1 | 10/2012 | John et al. |
| 2012/0253830 A1 | 10/2012 | John et al. |
| 2012/0253831 A1 | 10/2012 | John et al. |
| 2012/0253832 A1 | 10/2012 | John et al. |
| 2012/0253833 A1 | 10/2012 | John et al. |
| 2012/0253846 A1 | 10/2012 | John et al. |
| 2012/0265591 A1 | 10/2012 | Hwang |
| 2013/0041968 A1 | 2/2013 | Cohen et al. |
| 2013/0103602 A1 | 4/2013 | Melnick et al. |
| 2013/0197980 A1 | 8/2013 | Lerner et al. |
| 2013/0246082 A1 | 9/2013 | Brylawski et al. |
| 2013/0311389 A1 | 11/2013 | Kaehler et al. |
| 2014/0039911 A1 | 2/2014 | Iyer |
| 2014/0088985 A1 | 3/2014 | Grant et al. |
| 2014/0214435 A1 | 7/2014 | Previdi |
| 2014/0249861 A1 | 9/2014 | Gamble et al. |
| 2014/0249864 A1* | 9/2014 | Sultan ................... G06Q 50/22 705/4 |
| 2014/0278456 A1 | 9/2014 | Milosevich et al. |
| 2015/0088557 A1 | 3/2015 | Huynh et al. |
| 2015/0142479 A1 | 5/2015 | Porter et al. |
| 2015/0149197 A1 | 5/2015 | Guinan |
| 2015/0154565 A1 | 6/2015 | Kaehler et al. |
| 2015/0154588 A1 | 6/2015 | Purves et al. |
| 2015/0195224 A1 | 7/2015 | Karnin et al. |
| 2015/0213195 A1 | 7/2015 | Blechman |
| 2015/0234991 A1 | 8/2015 | Pinsonneault |
| 2015/0235177 A1 | 8/2015 | Shraim et al. |
| 2015/0269695 A1 | 9/2015 | Pinsonneault et al. |
| 2015/0332422 A1 | 11/2015 | Gilmartin |
| 2015/0371000 A1 | 12/2015 | Pinsonneault |
| 2016/0012465 A1 | 1/2016 | Sharp |
| 2016/0213512 A1 | 7/2016 | Palanker et al. |
| 2016/0267544 A1 | 9/2016 | Flood et al. |
| 2016/0267545 A1 | 9/2016 | Glass et al. |
| 2016/0307195 A1 | 10/2016 | Cantwell et al. |
| 2016/0358142 A1 | 12/2016 | Hillen |
| 2016/0359795 A1 | 12/2016 | Fehling |
| 2017/0034087 A1 | 2/2017 | Borenstein et al. |
| 2017/0220768 A1 | 8/2017 | Tanner, Jr. et al. |
| 2017/0323295 A1 | 11/2017 | Kranzley et al. |
| 2017/0324695 A1 | 11/2017 | Fischer et al. |
| 2018/0012244 A1 | 1/2018 | Leonardi |
| 2018/0366810 A1 | 12/2018 | Nero et al. |
| 2019/0213212 A1 | 7/2019 | Adato et al. |
| 2019/0385733 A1 | 12/2019 | Kaye et al. |
| 2019/0385734 A1 | 12/2019 | Pinsonneault |
| 2021/0319887 A1 | 10/2021 | Derrick, Jr. et al. |

FOREIGN PATENT DOCUMENTS

| | | |
|---|---|---|
| CA | 2792252 A1 | 4/2013 |
| CA | 2810686 A1 | 10/2013 |
| CN | 102362778 | 2/2012 |
| KR | 100755440 | 9/2007 |
| KR | 100793852 | 1/2008 |
| KR | 101038074 | 6/2011 |
| KR | 101101692 | 12/2011 |
| KR | 20110138108 | 12/2011 |
| KR | 20110138572 | 12/2011 |
| KR | 101154858 | 6/2012 |
| WO | WO 1991/006917 A1 | 5/1991 |
| WO | WO 1995/003569 A2 | 2/1995 |
| WO | WO 1997/025682 A1 | 7/1997 |
| WO | WO 1998/050871 A1 | 11/1998 |
| WO | WO 2000/039737 A1 | 7/2000 |
| WO | WO 2003/098401 A2 | 11/2003 |
| WO | WO 2007/025295 A2 | 3/2007 |
| WO | WO 2007/094772 A1 | 8/2007 |
| WO | WO 2008/092109 A2 | 7/2008 |

OTHER PUBLICATIONS

U.S. Appl. No. 15/422,184, filed Feb. 1, 2017, U.S. Pat. No. 10,924,585, Patented.

CMS Updates Drug Dashboards with Prescription Drug Pricing and Spending Data, Data, Medicare Part D, Prescription drugs (Mar. 14, 2019).

How to Estimate the Cost of a Prescription. Pam Olson, Sr. Client Services Executive, Navitus Health Solutions (Year: 2015).

United States Patent and Trademark Office, Final Office Action received for U.S. Appl. No. 16/453,509, dated Aug. 18, 2021, 16 pages, U.S.

United States Patent and Trademark Office, Non-Final Office Action received for U.S. Appl. No. 16/792,413, dated Aug. 5, 2021, 32 pages, U.S.

United States Patent and Trademark Office, Notice of Allowance received for U.S. Appl. No. 15/085,166, dated Sep. 10, 2021, 21 pages, U.S.

United States Patent and Trademark Office, Corrected Notice of Allowability received for U.S. Appl. No. 15/085,166, dated Sep. 20, 2021, 6 pages, U.S.

United States Patent and Trademark Office, Notice of Allowance received for U.S. Appl. No. 17/092,705, dated Dec. 23, 2021, 42 pages, U.S.

Pharmacy Reject Codes NCPDP, 5 pages.

St. Vincent's first to use Birmingham startup's information system. The Birmingham News [Online] Apr. 11, 2005. URL: http://www.awarix.com.

St. Vincent's is Digital Flagship D. Lockridge; Birmingham Medical News [Online] Sep. 2005.

Two automatic identification technology, neither new in the sense if being recent developments . . . Patient Safety & Quality Healthcare [Online] Aug. 2005_ URL: http://www_awarix.com.

Advisory Action for U.S. Appl. No. 14/193,294 dated Nov. 9, 2017, 3 pages.

Advisory Action for U.S. Appl. No. 15/085,166 dated Apr. 11, 2019, 4 pages.

Advisory Action for U.S. Appl. No. 15/085,166 dated Apr. 29, 2020, 3 pages.

Advisory Action for U.S. Appl. No. 15/137,371 dated Feb. 25, 2019, 5 pages.

Advisory Action for U.S. Appl. No. 15/427,746 dated Jul. 2, 2019, 2 pages.

Advisory Action received for U.S. Appl. No. 15/085,166, dated Jan. 29, 2021, 3 pages, US.

(56) References Cited

OTHER PUBLICATIONS

Almaro, Moshe; "Recovery and Reuse of Unused Prescription Drugs" MIT What Matters: Aug. 2005.

American Society of Health-System Pharmacists (ASHP), "Is Prescribing the Next Step in the Evolution of Pharmacy?" May 15, 2012.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Anonymous, Medic; On-line Goes In-House, Chain Store Age Executive, Jan. 1987, vol. 63, Issue 1, USA; Abstract only.

Anonymous, Pharmacy Industry Leaders Launch Firm to Supply Real-Time Data, PR Newswire, Jul. 30, 2001, p. 1, New York, NY, USA.

Anonymous, TechRx Announces Successful Beta Deployment of T-Rex. PR Newswire. May 13, 2002.

Consalvo, Bob; "City of Boston in the City Council" hearing notice, Dec. 6, 2006.

Coping with Information Overload. The News Source for Healthcare Information Technology [Online] Nov. 2004. URL: http://www.awarix.com.

Decision to Grant European Patent Application No. 13809457.8 dated May 18, 2017.

Examiner's Answer for U.S. Appl. No. 14/145,027 dated Sep. 7, 2016, 27 pages.

Extended European Search Report for European Application No. 13809457.8 dated Apr. 15, 2016, 6 pages.

Final Office Action for U.S. Appl. No. 12/140,015 dated Jan. 31, 2011, 10 pages.

Final Office Action for U.S. Appl. No. 12/415,062 dated Oct. 6, 2011, 18 pages.

Final Office Action for U.S. Appl. No. 12/555,589 dated Apr. 11, 2012, 17 pages.

Final Office Action for U.S. Appl. No. 12/560,071 dated Aug. 28, 2015, 8 pages.

Final Office Action for U.S. Appl. No. 12/560,071 dated Nov. 8, 2012, 11 pages.

Final Office Action for U.S. Appl. No. 12/570,982 dated Apr. 11, 2014, 22 pages.

Final Office Action for U.S. Appl. No. 12/570,982 dated Aug. 28, 2015, 10 pages.

Final Office Action for U.S. Appl. No. 12/570,982 dated Jan. 17, 2013, 19 pages.

Final Office Action for U.S. Appl. No. 12/730,015 dated Aug. 14, 2012, 10 pages.

Final Office Action for U.S. Appl. No. 12/978,898 dated May 16, 2013, 16 pages.

Final Office Action for U.S. Appl. No. 13/721,890 dated Jun. 24, 2015, 14 pages.

Final Office Action for U.S. Appl. No. 13/721,890 dated Nov. 25, 2016, 12 pages.

Final Office Action for U.S. Appl. No. 13/782,909 dated May 31, 2016, 18 pages.

Final Office Action for U.S. Appl. No. 13/782,909 dated Oct. 6, 2015, 24 pages.

Final Office Action for U.S. Appl. No. 13/804,175 dated Oct. 6, 2015, 6 pages.

Final Office Action for U.S. Appl. No. 13/827,676 dated Jul. 13, 2015, 17 pages.

Final Office Action for U.S. Appl. No. 14/090,113 dated Jan. 6, 2016, 18 pages.

Final Office Action for U.S. Appl. No. 14/090,122 dated Apr. 22, 2016, 13 pages.

Final Office Action for U.S. Appl. No. 14/145,027 dated Nov. 19, 2015, 12 pages.

Final Office Action for U.S. Appl. No. 14/193,294 dated May 2, 2016, 29 pages.

Final Office Action for U.S. Appl. No. 14/218,326 dated Jun. 30, 2016, 17 pages.

Final Office Action for U.S. Appl. No. 15/085,166, dated Dec. 4, 2020, 11 pages.

Final Office Action for U.S. Appl. No. 15/137,371 dated Nov. 28, 2018, 24 pages.

Final Office Action for U.S. Appl. No. 15/427,746 dated Apr. 15, 2019, 9 pages.

Kaplan et al., "Let the Needles Do the Talking! Evaluating the New Haven Needle Exchange." Interfaces 23:1, Jan.-Feb. 1993 (pp. 7-26).

Lamb, J., New Era of Electronic Medicine Management: E-Prescriptions, Britain's Traditionally Cautious National Health Service is Starting Trials for Online Prescription, with the Aim of Cutting Costs, Finance Times, London, Feb. 21, 2001, p. 6, London, United Kingdom.

Letter Restarting Period for Response for U.S. Appl. No. 13/721,890 dated Jan. 14, 2015, 11 pages.

Marie Chisholm et al. "Pharmaceutical Manufacturer Assistance Program." Arch Intern Med. vol. 162, Apr. 8, 2002.

Non-Final Office Action for U.S. Appl. No. 12/560,071 dated Jun. 21, 2012, 11 pages.

Non-Final Office Action for U.S. Appl. No. 12/570,982 dated Jun. 20, 2012, 10 pages.

Non-Final Office Action for U.S. Appl. No. 14/193,294 dated Feb. 21, 2017, 32 pages.

Non-Final Office Action for U.S. Appl. No. 15/085,166 dated Jun. 12, 2020, 26 pages.

Non-Final Office Action for U.S. Appl. No. 16/180,915 dated Jun. 1, 2020, 40 pages.

Non-final Office Action for U.S. Appl. No. 12/140,015 dated Oct. 8, 2010, 9 pages.

Non-final Office Action for U.S. Appl. No. 12/189,650 dated Jan. 22, 2010, 11 pages.

Non-final Office Action for U.S. Appl. No. 12/189,654 dated Jan. 22, 2010, 11 pages.

Non-Final Office Action for U.S. Appl. No. 12/388,956 dated Feb. 3, 2011, 11 pages.

Non-Final Office Action for U.S. Appl. No. 12/415,062 dated Mar. 30, 2011, 23 pages.

Non-Final Office Action for U.S. Appl. No. 12/555,589 dated Dec. 9, 2011, 12 pages.

Non-Final Office Action for U.S. Appl. No. 12/560,071 dated Sep. 23, 2014, 17 pages.

Non-Final Office Action for U.S. Appl. No. 12/570,982 dated Sep. 12, 2013, 22 pages.

Non-Final Office Action for U.S. Appl. No. 12/730,015 dated Mar. 6, 2012, 9 pages.

Non-Final Office Action for U.S. Appl. No. 12/956,411 dated Jan. 24, 2011, 9 pages.

Non-Final Office Action for U.S. Appl. No. 12/978,898 dated Feb. 6, 2013, 12 pages.

Non-Final Office Action for U.S. Appl. No. 12/982,395 dated Dec. 11, 2012, 13 pages.

Non-Final Office Action for U.S. Appl. No. 13/721,890 dated Jan. 9, 2015, 11 pages.

Non-Final Office Action for U.S. Appl. No. 13/721,890 dated Jun. 14, 2016, 9 pages.

Non-final Office Action for U.S. Appl. No. 13/782,909 dated Feb. 11, 2016, 17 pages.

Non-Final Office Action for U.S. Appl. No. 13/827,676 dated Dec. 26, 2014, 13 pages.

Non-final Office Action for U.S. Appl. No. 13/827,676 dated Dec. 30, 2015, 23 pages.

Non-Final Office Action for U.S. Appl. No. 14/145,027 dated Mar. 23, 2015, 13 pages.

Non-Final Office Action for U.S. Appl. No. 15/137,371 dated May 29, 2018, 19 pages.

Non-Final Office Action for U.S. Appl. No. 15/427,746 dated Oct. 18, 2018, 9 pages.

Non-Final Office Action for U.S. Appl. No. 16/819,258 dated Sep. 4, 2020, 6 pages.

(56) References Cited

OTHER PUBLICATIONS

Non-Final Office Action received for U.S. Appl. No. 15/085,166, dated Mar. 17, 2021, 11 pages.
Non-Final Office Action received for U.S. Appl. No. 16/551,962, dated Mar. 2, 2021, 16 pages.
Non-Final Office Action received for U.S. Appl. No. 16/453,509 dated Mar. 26, 2021, 45 pages.
Non-Final Office Action received for U.S. Appl. No. 16/832,318 dated Apr. 23, 2021, 52 pages.
Notice of Allowance and Fees(s) Due for U.S. Appl. No. 15/925,011 dated Jan. 22, 2021, 15 pages.
Notice of Allowance for U.S. Appl. No. 16/180,915 dated Dec. 11, 2020, 23 pages.
Notice of Allowance for U.S. Appl. No. 11/674,069 dated Jul. 19, 2010, 13 pages.
Notice of Allowance for U.S. Appl. No. 12/140,015 dated Jun. 10, 2011, 10 pages.
Notice of Allowance for U.S. Appl. No. 12/165,221 dated Nov. 16, 2010, 6 pages.
Notice of Allowance for U.S. Appl. No. 12/189,650 dated Aug. 13, 2010, 11 pages.
Notice of Allowance for U.S. Appl. No. 12/388,956 dated Jun. 14, 2011, 9 pages.
Notice of Allowance for U.S. Appl. No. 12/956,411 dated Aug. 5, 2011, 8 pages.
Notice of Allowance for U.S. Appl. No. 12/982,395 dated Apr. 24, 2013, 9 pages.
Notice of Allowance for U.S. Appl. No. 14/181,011 dated May 15, 2019, 9 pages.
Notice of Allowance for U.S. Appl. No. 15/137,371 dated May 2, 2019, 11 pages.
Notice of Allowance for U.S. Appl. No. 15/427,746 dated Dec. 4, 2019, 5 pages.
Notice of Allowance for U.S. Appl. No. 15/427,746 dated Jul. 31, 2019, 8 pages.
Notice of Allowance received for U.S. Application No. 14,643,468, dated Oct. 24, 2018, 22 pages.
Notice of Allowance received for U.S. Appl. No. 14/181,011, filed Feb. 13, 2019, 9 pages.
Office Action for U.S. Appl. No. 14/193,294 dated Aug. 4, 2017, 31 pages.
Office Action for U.S. Appl. No. 14/193,294 dated Mar. 22, 2018, 28 pages.
Office Action for U.S. Appl. No. 14/193,294 dated Sep. 19, 2018, 27 pages.
Office Action for U.S. Appl. No. 14/229,043 dated Feb. 27, 2019, 18 pages.
Office Action for U.S. Appl. No. 14/229,043 dated Jul. 24, 2017, 19 pages.
Office Action for U.S. Appl. No. 14/229,043 dated Sep. 5, 2019, 22 pages.
Office Action for U.S. Appl. No. 14/229,043 dated Sep. 14, 2018, 17 pages.
Office Action for U.S. Appl. No. 14/643,468 dated Mar. 8, 2018, 11 pages.
Office Action for U.S. Appl. No. 15/085,166 dated Dec. 27, 2018, 24 pages.
Office Action for U.S. Appl. No. 15/085,166 dated Jun. 29, 2018, 19 pages.
Office Action for U.S. Appl. No. 15/085,166 dated Mar. 3, 2020, 25 pages.
Office Action for U.S. Appl. No. 15/085,166 dated Sep. 4, 2019, 23 pages.
Office Action for U.S. Appl. No. 15/422,184 dated Aug. 27, 2019, 16 pages.
Office Action for U.S. Appl. No. 15/422,184 dated Feb. 15, 2019, 15 pages.
Office Action for U.S. Appl. No. 15/422,184 dated Jan. 14, 2020, 19 pages.
Office Action for U.S. Appl. No. 15/422,184 dated Sep. 10, 2018, 13 pages.
Office Action for U.S. Appl. No. 15/925,011 dated Jun. 27, 2019, 15 pages.
Office Action for U.S. Appl. No. 15/925,011 dated Oct. 24, 2019, 19 pages.
Office Action for U.S. Appl. No. 15/925,948 dated Jun. 25, 2019, 13 pages.
Office Action for U.S. Appl. No. 15/925,948 dated Oct. 23, 2019, 18 pages.
Office Action for U.S. Appl. No. 12/570,982 dated Apr. 8, 2015, 9 pages.
Office Action for U.S. Appl. No. 13/782,909 dated Jun. 25, 2015, 16 pages.
Office Action for U.S. Appl. No. 13/804,175 dated Mar. 13, 2015, 9 pages.
Office Action for U.S. Appl. No. 14/090,113 dated Jun. 18, 2015, 14 pages.
Office Action for U.S. Appl. No. 14/090,122 dated Oct. 21, 2016, 12 pages.
Office Action for U.S. Appl. No. 14/090,122 dated Sep. 11, 2015, 10 pages.
Office Action for U.S. Appl. No. 14/181,011 dated Feb. 29, 2016, 23 pages.
Office Action for U.S. Appl. No. 14/181,011 dated Mar. 20, 2017, 28 pages.
Office Action for U.S. Appl. No. 14/181,011 dated Oct. 20, 2016, 28 pages.
Office Action for U.S. Appl. No. 14/181,011 dated Sep. 12, 2017, 17 pages.
Office Action for U.S. Appl. No. 14/193,294 dated Dec. 17, 2015, 21 pages.
Office Action for U.S. Appl. No. 14/218,326 dated Dec. 1, 2015, 13 pages.
Opar, Alisa; "Rising drug costs prompt new uses for old pills." Nature Medicine, 1211333 (2006).
PTAB Decision on Appeal for U.S. Appl. No. 14/145,027 mailed May 31, 2018, 11 pages.
PTAB Decision on Request for Rehearing for U.S. Appl. No. 14/145,027 mailed Aug. 30, 2018, 9 pages.
Sampson, R.J., Taking Control of Health Care Costs, Best's Review—Life Health Insurance Edition, Nov. 1983, vol. 84, Issue 7, USA; Abstract only.
Siler, Sharon et al., "Safe Disposal of Unused Controlled Substances" Avalere Health 2008.
Strom, Stephanie; "Old Pills Finding New Medicine Cabinets" NY Times, May 18, 2005.
Subnotebooks, Phones, and More. St. Vincent's Gets on Track. Mobile Health Data [Online], Nov. 19, 2004. URL:http://www.awarix.com.
Supplemental Notice of Allowability received for U.S. Appl. No. 16/180,915, dated Jan. 28, 2021, 2 pages.
Supplemental Notice of Allowability received for U.S. Appl. No. 16/180,915, dated Mar. 12, 2021, 10 pages.
U.S. Notice of Allowance received for U.S. Appl. No. 16/819,258, dated Nov. 16, 2020, 8 pages, U.S.
U.S. Appl. No. 14/229,043, "Systems and Methods for Monitoring and Reporting Redemption Information at a Pharmacy for Patient Incentive Information Identified at the Time of Prescribing," Unpublished (filed Mar. 28, 2014), (Roger Pinsonneault, Inventor), (McKesson Corporation, Assignee), abandoned.
U.S. Appl. No. 15/084,034, "Prescription Provider System," Unpublished (filed Mar. 29, 2016), (Scott Genone, Inventor), (McKesson Corporation, Assignee), abandoned.
U.S. Appl. No. 15/085,166, "Alternative Therapy Identification System", Unpublished (filed Mar. 30, 2016), (Elizabeth Kaye, Inventor), (McKesson Corporation, Assignee), pending.
U.S. Appl. No. 17/012,565, "Method, Apparatus, and Computer Program Product for Performing an Alternative Evaluation Procedure in Response to an Electronic Message," Unpublished (filing date Sep. 4, 2020), (Stacy Hopkins, et al., Inventors) (McKesson Corporation, Assignee), pending.

(56) References Cited

OTHER PUBLICATIONS

U.S. Appl. No. 17/092,705, "Computing System and Method for Automatically Reversing an Action Indicated by an Electronic Message," Unpublished (filing date Nov. 9, 2020), (Patrick Harris, Inventor) (McKesson Corporation, Assignee), pending.

U.S. Appl. No. 16/792,413, "Method, Apparatus and Computer Program Product for Partitioning Prescription Transaction Costs in an Electronic Prescription Transaction," Unpublished (filed Feb. 17, 2020), (Jared Burdine, Inventor) (McKesson Corporation, Assignee), pending.

U.S. Appl. No. 16/867,286, "Method, Apparatus, and Computer Program Product for Constructing Electronic Message Responses Dependent Upon Historical Information," Unpublished (filed May 5, 2020), (Jared Burdine, et al., Inventor) (McKesson Corporation, Assignee), pending.

U.S. Appl. No. 16/832,318, "Method, Apparatus, and Computer Program Product for Estimated Prescription Costs", Unpublished (filed Mar. 27, 2020), (Stacy Hopkins, Inventor), (McKesson Corporation, Assignee), pending.

United States Patent and Trademark Office, Advisory Action for U.S. Appl. No. 15/422,184, dated Jun. 25, 2019, 4 pages, U.S.A.

United States Patent and Trademark Office, Advisory Action for U.S. Appl. No. 15/422,184, dated Mar. 26, 2020, 5 pages, U.S.A.

United States Patent and Trademark Office, Advisory Action for U.S. Appl. No. 15/925,011, dated Jan. 31, 2020, 3 pages, U.S.A.

United States Patent and Trademark Office, Advisory Action for U.S. Appl. No. 15/925,948, dated Jan. 31, 2020, 4 pages, U.S.A.

United States Patent and Trademark Office, Notice of Allowability received for U.S. Appl. No. 15/422,184, dated Nov. 16, 2020, 2 pages, U.S.A.

United States Patent and Trademark Office, Notice of Allowance received for U.S. Appl. No. 15/422,184, dated Oct. 13, 2020, 12 pages, U.S.A.

United States Patent and Trademark Office, Notice of Allowance received for U.S. Appl. No. 15/925,948, dated Nov. 5, 2020, 22 pages, U.S.A.

United States Patent and Trademark Office, Notice of Allowance received for U.S. Appl. No. 16/043,401, dated Aug. 10, 2020, 8 pages, U.S.A.

United States Patent and Trademark Office, Office Action for U.S. Appl. No. 15/925,011, dated Apr. 8, 2020, 17 pages, U.S.A.

United States Patent and Trademark Office, Office Action for U.S. Appl. No. 15/925,948, dated Mar. 23, 2020, 29 pages, U.S.A.

United States Patent and Trademark Office, Office Action received for U.S. Appl. No. 15/422,184, dated May 18, 2020, 31 pages, U.S.A.

United States Patent and Trademark Office, Office Action received for U.S. Appl. No. 15/925,011, dated Oct. 8, 2020, 8 pages, U.S.A.

Wisconsin Physicians Service (WPS) Insurance Corporation, "How to Read Your Explanation of Benefits Chart," Jun. 16, 2012. www.ncoil.org/news/DrugCards2.doc dated Apr. 2002, 5 pages.

Scientific and Technical Information Center, Report of Information from Dialog (NPL (non-patent literature) Search Results, Abstracts only), dated Nov. 1, 2021, (Year: 2021), 9 pages.

United States Patent and Trademark Office, Advisory Action received for U.S. Appl. No. 16/453,509, dated Oct. 12, 2021, 5 pages, U.S.

United States Patent and Trademark Office, Final Office Action received for U.S. Appl. No. 16/551,962, dated Nov. 4, 2021, 32 pages, U.S.

United States Patent and Trademark Office, Final Office Action received for U.S. Appl. No. 16/832,318, dated Nov. 3, 2021, 22 pages, U.S.

United States Patent and Trademark Office, Non-Final Office Action received for U.S. Appl. No. 15/085,166, dated Jan. 10, 2022, 12 pages, U.S.

United States Patent and Trademark Office, Final Office Action received for U.S. Appl. No. 16/792,413, dated Jan. 10, 2022, 80 pages, U.S.

United States Patent and Trademark Office, Advisory Action received for U.S. Appl. No. 16/832,318, dated Jan. 28, 2022, 4 pages, U.S.

United States Patent and Trademark Office, Non-Final Office Action received for U.S. Appl. No. 16/867,286, dated Feb. 22, 2022, 38 pages, U.S.

Zhu, V. et al., "Data for drugs available through low-cost prescription drug programs are available through pharmacy benefit manager and claims data," BMC Clinical Pharmacology, Jun. 22, 2012, vol. 12, No. 12., BioMed Central Ltd., UK.

Google NPL (non-patent literature) Search on "pharmacy payment benefit copay NDC database", retrieved from the Internet at <https//scholar.google.com/scholar?hl= en&as_sdt-3,47&g-pharmacy+payment+benefit+copay+NDC+database> on Feb. 20, 2022 at 3:02 pm, 1 page.

Google NPL (non-patent literature) Search on "pharmacy payment benefit copay NDC database", retrieved from the Internet at <https://www.google.com/search?g =pharmacy+payment+benefit+copay+ndc+database&source=int&tbs=cdr%3A1%2Ccd_min%3A1%2F1%2F2010%2 . . . > on Feb. 20, 2022 at 3:00 pm, 2 pages.

United States Patent and Trademark Office, Advisory Action received for U.S. Appl. No. 16/792,413, dated Mar. 10, 2022, 4 pages, US.

United States Patent and Trademark Office, Notice of Allowance and Fee(s) Due received for Application No. 16/551,962, dated Mar. 16, 2022, 10 pages, U.S.

United States Patent and Trademark Office, Notice of Allowance and Fee(s) Due received for U.S. Appl. No. 17/092,705, dated Mar. 24, 2022, 9 pages, U.S.

United States Patent and Trademark Office, Notice of Allowance and Fee(s) Due received for U.S. Appl. No. 16/551,962, dated Mar. 1, 2022, 14 pages, U.S.

United States Patent and Trademark Office, Non-Final Office Action received for U.S. Appl. No. 17/012,565, dated Apr. 12, 2022, 19 pages, U.S.

United States Patent and Trademark Office, Non-Final Office Action received for U.S. Appl. No. 16/453,509, dated Apr. 28, 2022, 16 pages, U.S.A.

United States Patent and Trademark Office, Non-Final Office Action received for U.S. Appl. No. 16/552,021, dated May 3, 2022, 60 pages, U.S.A.

United States Patent and Trademark Office, Non-Final Office Action received for U.S. Appl. No. 17/175,939, dated May 12, 2022, 48 pages, U.S.A.

Chu, Kuan-Yu, et al., "Incremental analysis of the reengineering of an outpatient billing process: an empirical study in a public hospital", BMC Health Services Research, Jun. 13, 2013, vol. 13, No. 215, 8 pages, BioMed Central Ltd, UK.

Google Patents Search (including Web Search History, Prior Art Search Printable History Generator) on "pharmacy payment benefit copay NDC database) (prescription) (code) (refills) (error code) country:US before:filing: Dec. 31, 2013", retrieved from the Internet at <https://patents.google.com/?q=pharmacy+payment+benefit+copay+ NDC+database&q=prescription&q=code&q=refills&q=error+code&country=US&before-filing:Dec. 31, 2013> retrieved on Jun. 1, 2022, 4 pages.

Google Scholar Search (including Web Search History, Prior Art Search Printable History Generator) on "pharmacy payment benefit copay NDC database prescription . . . ", retrieved from the Internet at <https://scholar.google.com/scholar?hl-en&as_sdt-0%2C47&as_ylo-2010&as_yhi-2013&q-pharmacy+payment+benefit +copay+NDC+database+pres . . . > retrieved on Jun. 1, 2022, 3 pages.

United States Patent and Trademark Office, Non-Final Office Action received for U.S. Appl. No. 16/792,413, dated May 24, 2022, 48 pages, U.S.

United States Patent and Trademark Office, Non-Final Office Action received for U.S. Appl. No. 17/144,426, dated May 31, 2022, 42 pages, U.S.

United States Patent and Trademark Office, Non-Final Office Action received for U.S. Appl. No. 16/832,318, dated Jun. 8, 2022, 17 pages, U.S.

United States Patent and Trademark Office, Notice of Allowance received for U.S. Appl. No. 17/092,705, dated May 31, 2022, 9 pages, U.S.

(56) References Cited

OTHER PUBLICATIONS

United States Patent and Trademark Office, Notice of Allowance received for U.S. Appl. No. 16/551,962, dated Jun. 8, 2022, 11 pages, U.S.

* cited by examiner

METHOD AND APPARATUS FOR PARSING AND DIFFERENTLY PROCESSING DIFFERENT PORTIONS OF A REQUEST

CROSS-REFERENCE TO RELATED APPLICATIONS

This application is a continuation of U.S. application Ser. No. 15/925,011, filed Mar. 19, 2018, which is a continuation-in-part of U.S. application Ser. No. 15/422,184, filed Feb. 1, 2017, now issued as U.S. Pat. No. 10,924,585, the entire contents of both of which are incorporated herein by reference.

TECHNOLOGICAL FIELD

An example embodiment of the present invention relates to providing for a plurality of different actions to be taken in response to receipt of an electronic message and based upon parsing and differently processing different portions of the electronic message.

BACKGROUND

Messages are frequently transmitted in accordance with a predefined structure. The predefined structure generally defines the fields of information included within the message and the format in which the information is presented within each of the fields. While structured messages of this type are useful in terms of insuring that at least certain types of information are included within the message and that those certain types of information are transmitted in a manner that may be readily and consistently interpreted by the recipient, structured messages may limit the types of information that are conveyed and correspondingly limit the functionality that can be supported by messages having the predefined structure.

By way of example, the limitations upon the information that may be conveyed via a structured message and the format in which the information must be conveyed may prevent that message from supporting additional functionality needed by the sender or recipient, or require supplemental messages to be transmitted in order to provide additional information to the same recipient, particularly in instances in which the additional information is required in order for the recipient to perform additional functionality or services. This increase in the number of messages so as to provide additional information beyond that supported by structured messages not only increases the complexity and processing demands upon the source and recipient of the messages in order for the source to construct such supplemental messages, and for the recipient to link and interpret the additional messages, but also increases the load upon the network that must transmit the additional messages, as well as the risk of loss of such additional information in the event of errors when attempting to link or associate the supplemental messages.

By preventing a message from supporting additional functionality needed by the sender or recipient, the limitations upon the information that may be conveyed via a structured message may in some instances require the sender and recipient to develop a different work flow in order to support the additional functionality. For example, the sender and recipient may define a batch process for conveying the information that is not supported by the structured messages. As such, a time delay is created between the time at which the messages could otherwise have been transmitted in real time or near real time and the time at which the messages are submitted in batch format. As a result, the responses to the messages submitted in batch format are necessarily delayed and are not provided in real time or near real time, thereby limiting or even eliminating the usefulness of the responses for some applications that are dependent upon more timely feedback. Moreover, the development and support of alternative work flows for functionality that is not supported by the structured messages complicates the interaction between the parties by imposing additional and different work flows that must be followed in certain situations.

BRIEF SUMMARY

A method, computing device and computer program product are provided in accordance with an example embodiment in order to facilitate the inclusion of additional information in a single message beyond that for which the original message structure is predefined. As a result, the functionality or services performed by or for the source or recipient of the message may be enhanced by reliance upon the additional information that may be included in the message. By including additional information in the message in a manner that is able to be interpreted by the source or recipient, the method, computing device and computer program product of an example embodiment reduces or at least limits any increase in the number of messages transmitted between a source and the recipient in order to convey the additional information so as to enable the provision of the additional functionality or services, thereby reducing or limiting any increase in the load otherwise imposed upon the network that supports the delivery of the messages. Similarly, the method, computing device and computer program product of an example embodiment increase the efficiency with which the source and recipient communicate by reducing the number of messages that must be constructed by the source and linked and interpreted by the recipient in order to convey the additional information, as well as reducing or eliminating the risk of loss of such additional information in the event of errors when attempting to link or associate the supplemental messages.

In one embodiment, a computing device is provided that is configured to parse and differently process different portions of an electronic message. The computing device includes a communication interface configured to receive the electronic message. The electronic message includes a first portion formatted in accordance with a first predefined format and a second portion formatted differently than the first predefined portion. The computing device also includes processing circuitry configured to parse the electronic message to separately identify the first and second portions and to analyze the second portion of the electronic message to identify an action to be taken based thereupon. The second portion of the electronic message is analyzed by identifying a predefined type of information included within the second portion. The processing circuitry is also configured to construct a first message based at least in part upon the first portion formatted in accordance with the first predefined format to be transmitted to a request processor. Based upon the first message including the first portion formatted in accordance with the first predefined format, the processing circuitry is further configured to receive a first response from the request processor and to transform the information included within the second portion so as to have a second predefined format, different that the first predefined format. The processing circuitry is additionally configured to construct a second message including the information transformed to have the second predefined format to be transmitted to an entity different than the request processor and different than a source of the electronic message. Based upon the second message including the information transformed to have the second predefined format, the processing circuitry is configured to receive a second response from the entity and, based upon at least one of the first response from the request processor or the second response from the entity, the processing circuitry is configured to construct a response to the electronic message that is to be transmitted. The computing device further includes a database in communication with the processing circuitry and configured to store one or more of the electronic message, the first message, the first response, the second message, the second response or the response to the electronic message.

The processing circuitry of an example embodiment is configured to parse the electronic message by parsing the electronic message to identify a qualifier indicative of a presence of the second portion within the electronic message. In an example embodiment, the processing circuitry is configured to analyze the second portion of the electronic message by identifying a system edit instruction. In this embodiment, the processing circuitry is configured to construct the first message to be transmitted to the request processor by modifying the first portion in accordance with the system edit instruction prior to transmitting the message to the request processor. The processing circuitry of an example embodiment is further configured to identify a document to be provided. In this embodiment, the processing circuitry is configured to construct the response to the electronic message that is provided based upon information from the first or second portion of the electronic message, the first response from the request processor or the second response from the entity to include an access mechanism, such as an address, e.g., Uniform Resource Locator (URL), associated with the document, that is accessible in order to retrieve the document. The document to be provided may be stored. In addition, the processing circuitry may be configured to control access to the document and to maintain a record of access to the document. The processing circuitry of an example embodiment is configured to analyze the second portion of the electronic message to identify a role indicator. The action to be taken is based upon the role indicator. In this embodiment, the processing circuitry is configured to condition transmission of the first message to the request processor or provision of the response to the electronic message upon the role indicator having a predefined value.

In another embodiment, a method is provided for parsing and differently processing different portions of an electronic message. The method includes receiving the electronic message. The electronic message includes a first portion formatted in accordance with a first predefined format and a second portion formatted differently than the first predefined portion. The method also includes parsing the electronic message to separately identify the first and second portions and analyzing the second portion of the electronic message to identify an action to be taken based thereupon. In this regard, analyzing the second portion of the electronic message includes identifying a predefined type of information included within the second portion. The method further includes constructing a first message based at least in part upon the first portion formatted in accordance with the first predefined format to be transmitted to a request processor and, based upon the first message including the first portion formatted in accordance with the first predefined format, receiving a first response from the request processor. The method additionally includes transforming the information included within the second portion so as to have a second predefined format, different than the first predefined format, and constructing a second message including the information transformed to have the second predefined format to be transmitted to an entity different than the request processor and different than a source of the electronic message. Based upon the second message including the information transformed to have the second predefined format, the method includes receiving a second response from the entity and, based upon at least one of the first response from the request processor or the second response from the entity, constructing a response to the electronic message that is to be transmitted. The method further includes storing, in a database, one or more of the electronic message, the first message, the first response, the second message, the second response or the response to the electronic message.

The method of an example embodiment parses the electronic message by parsing the electronic message to identify a qualifier indicative of a presence of the second portion within the electronic message. In an example embodiment, the method analyzes the second portion of the electronic message by identifying a system edit instruction. The method of this example embodiment also constructs the first message to be transmitted to the request processor by modifying the first portion in accordance with the system edit instruction prior to transmitting the message to the request processor. In an example embodiment, the method identifies a document to be provided and constructs the response to the electronic message to be provided based upon information from the first or second portion of the electronic message, the first response from the request processor or the second response from the entity so as to include an access mechanism, such as a Uniform Resource Locator (URL) associated with the document, that is accessible in the response in order to permit the document to be retrieved using the access mechanism. The document to be provided may be stored. In addition, the processing circuitry may be configured to control access to the document and to maintain a record of access to the document. The method of an example embodiment analyzes the second portion of the electronic message by identifying a role indicator. The action to be taken is based upon the role indicator. In this example, the method further includes conditioning transmission of the first message to the request processor or provision of the response to the electronic message upon the role indicator having a predefined value.

In yet another example embodiment, a computer program product is provided that is configured to parse and differently process different portions of an electronic message. The computer program product includes a non-transitory computer readable medium having program code stored thereon with the program code including program code instructions configured, upon execution, to receive the electronic message. The electronic message includes a first portion formatted in accordance with a first predefined format and a second portion formatted differently than the first predefined portion. The program code also includes program code instructions configured to parse the electronic message to separately identify the first and second portions and program code instructions configured to analyze the second portion of the electronic message to identify an action to be taken based thereupon. In this regard, the second portion of the electronic message is analyzed by identifying a predefined type of information included within the second portion. The program code further includes program code instructions configured to construct a first message based at least in part upon the first portion formatted in accordance with the first predefined format to be transmitted to a request processor. Based upon the first message including the first portion formatted in accordance with the first predefined format, the program code additionally includes program code instructions configured to receive a first response from the request processor and program code instructions configured to transform the information included within the second portion so as to have a second predefined format, different that the first predefined format. The program code also includes program code instructions configured to construct a second message including the information transformed to have the second predefined format to be transmitted to an entity different than the request processor and different than a source of the electronic message. The program code also includes program code instructions configured, based upon the second message including the information transformed to have the second predefined format, to receive a second response from the entity, and, based upon at least one of the first response from the request processor or the second response from the entity, to construct a response to the electronic message that is to be transmitted. The program code further includes program code instructions configured to store, in a database, one or more of the electronic message, the first message, the first response, the second message, the second response or the response to the electronic message.

The program code instructions of an example embodiment that are configured to parse the electronic message include program code instructions configured to parse the electronic message to identify a qualifier indicative of a presence of the second portion within the electronic message. In an example embodiment, the program code instructions configured to analyze the second portion of the electronic message include program code instructions configured to identify a system edit instruction. In this embodiment, the program code instructions configured to construct the first message to be transmitted to the request processor include program code instructions configured to modify the first portion in accordance with the system edit instruction prior to transmitting the message to the request processor. In an example embodiment, the program code further includes program code instructions configured to identify a document to be provided, and the program code instructions configured to cause the response to the electronic message to be provided include program code instructions configured to construct the response to the electronic message that is provided based upon information from the first or second portion of the electronic message, the first response from the request processor or the second response from the entity so as to include an access mechanism that is accessible in order to retrieve the document. The program code instructions configured to analyze the second portion of the electronic message in accordance with an example embodiment include program code instructions configured to identify a role indicator. The action to be taken is based upon the role indicator. In this embodiment, the program code further includes program code instructions configured to condition transmission of the first message to the request processor or provision of the response to the electronic message upon the role indicator having a predefined value.

BRIEF DESCRIPTION OF THE DRAWINGS

Figure 1:
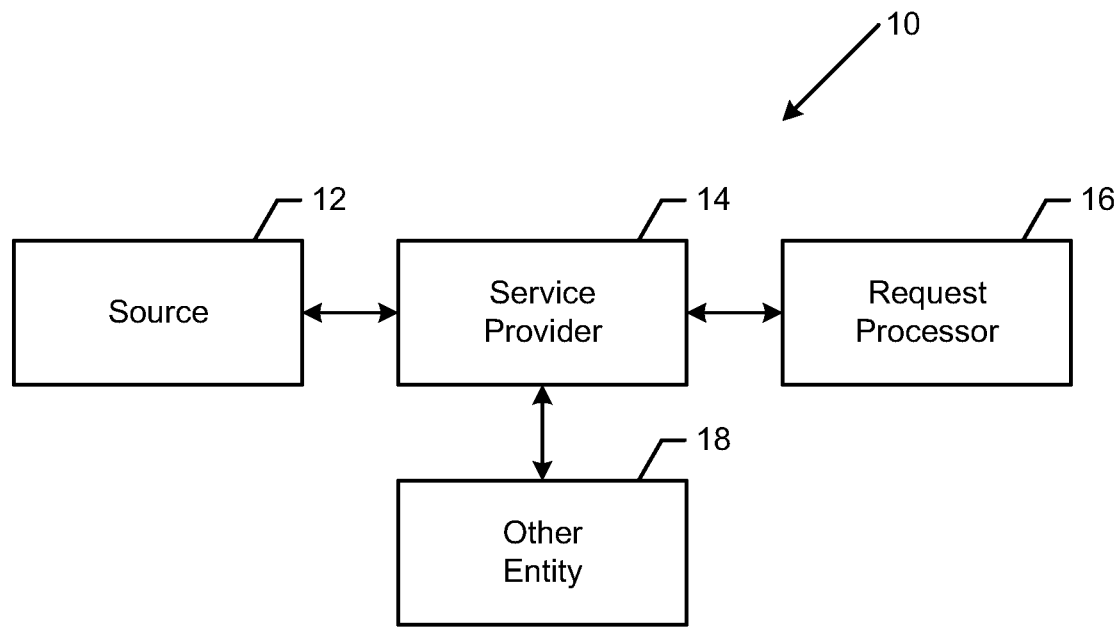
Figure 2:
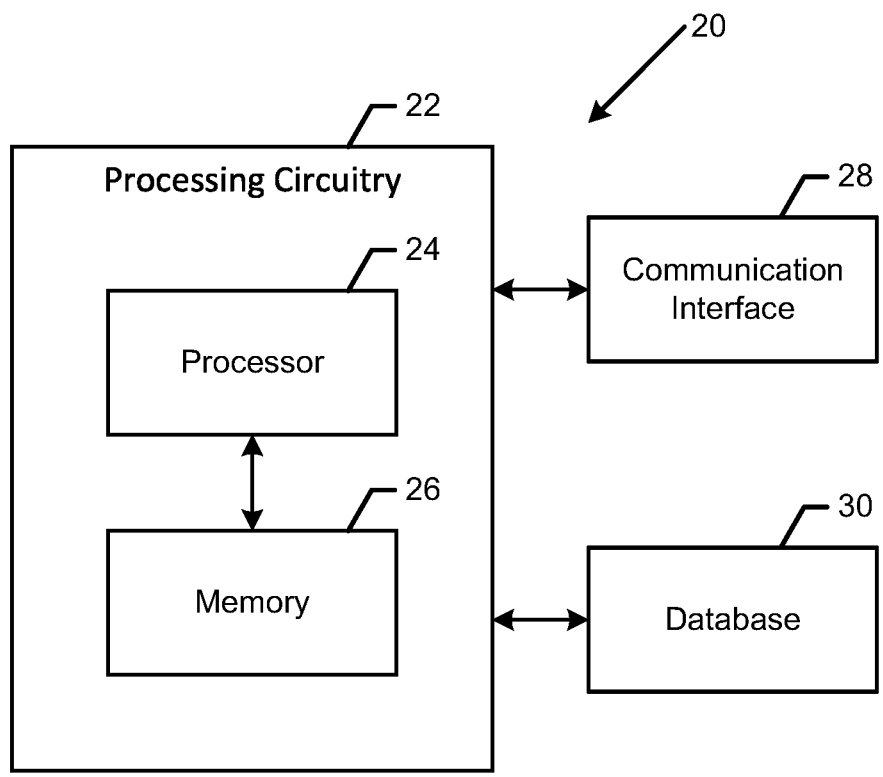
Figure 3:
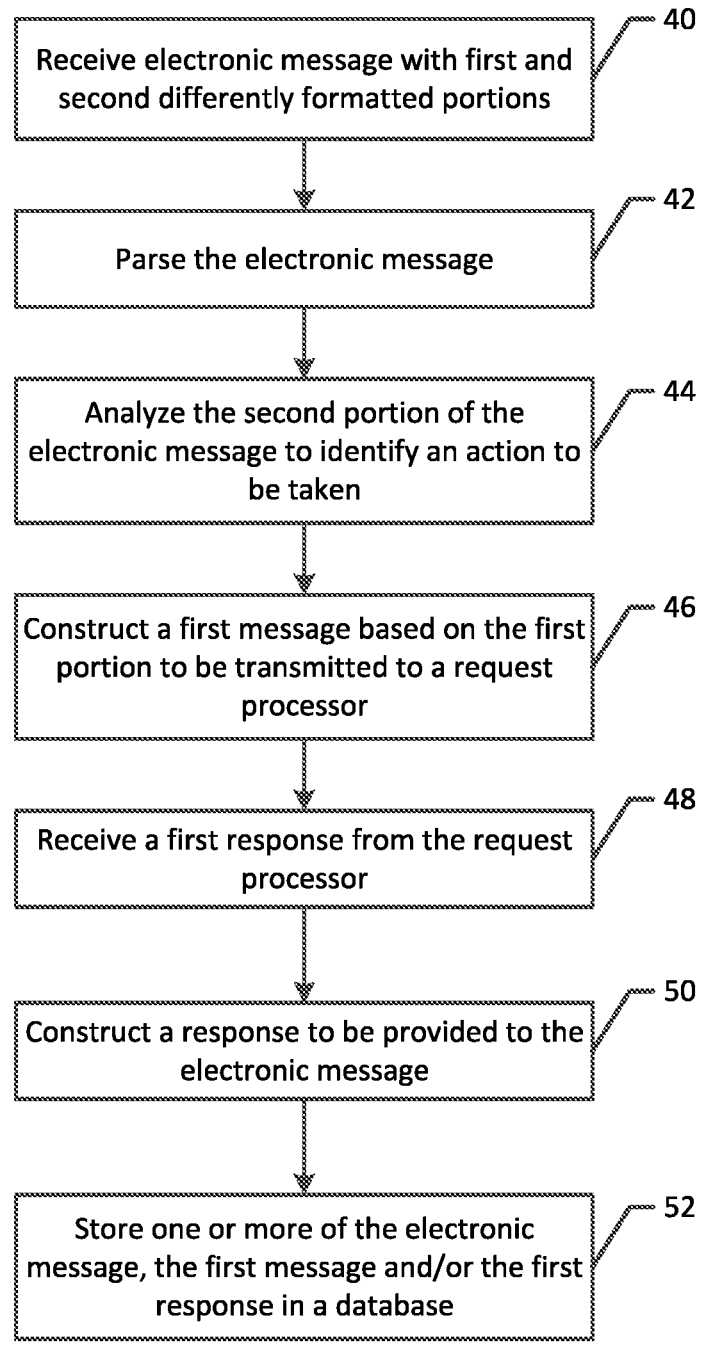
Figure 4:
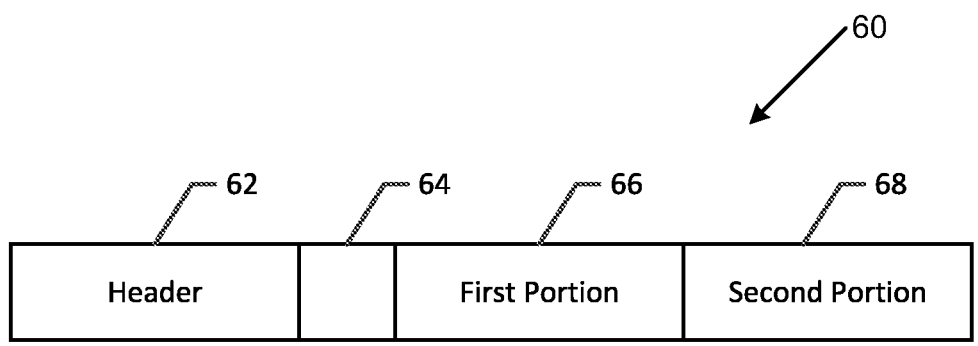
Figure 5:
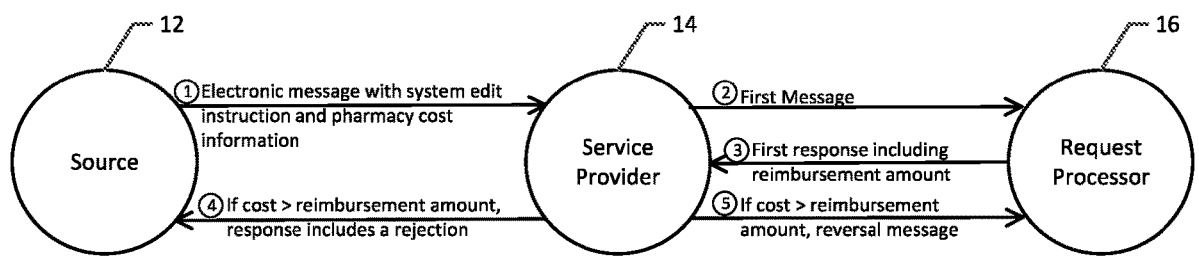
Figure 6:
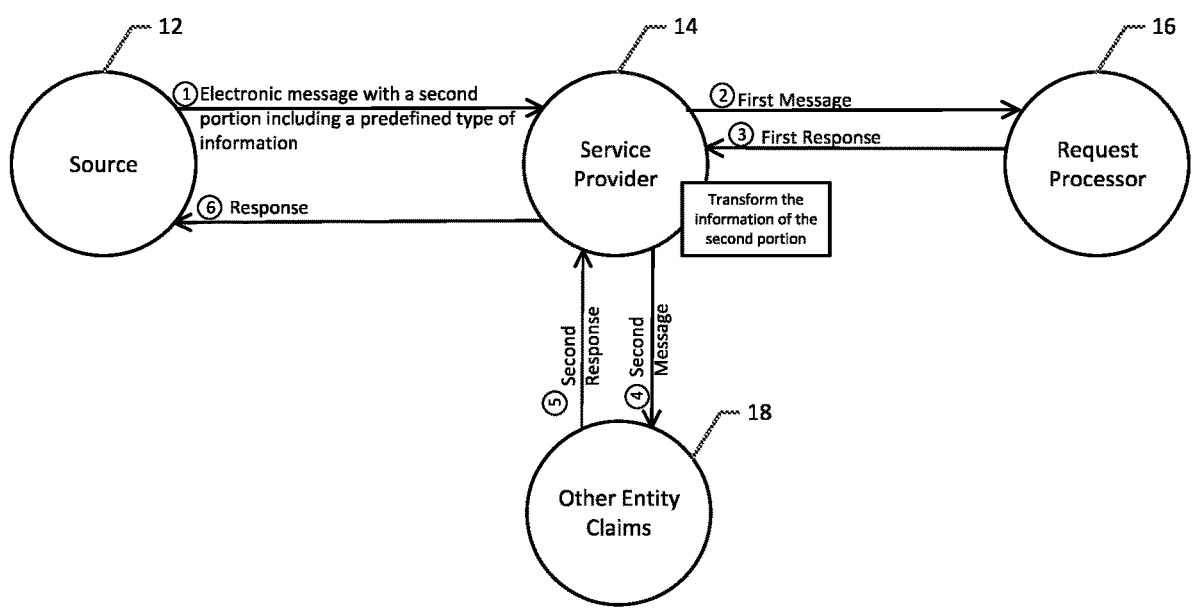
Figure 7:
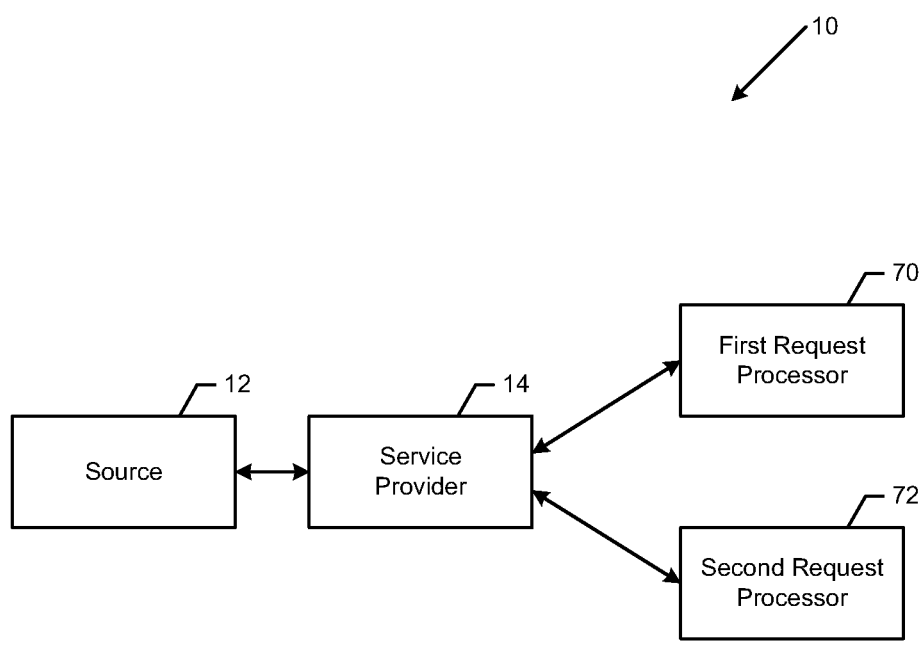
Figure 8:
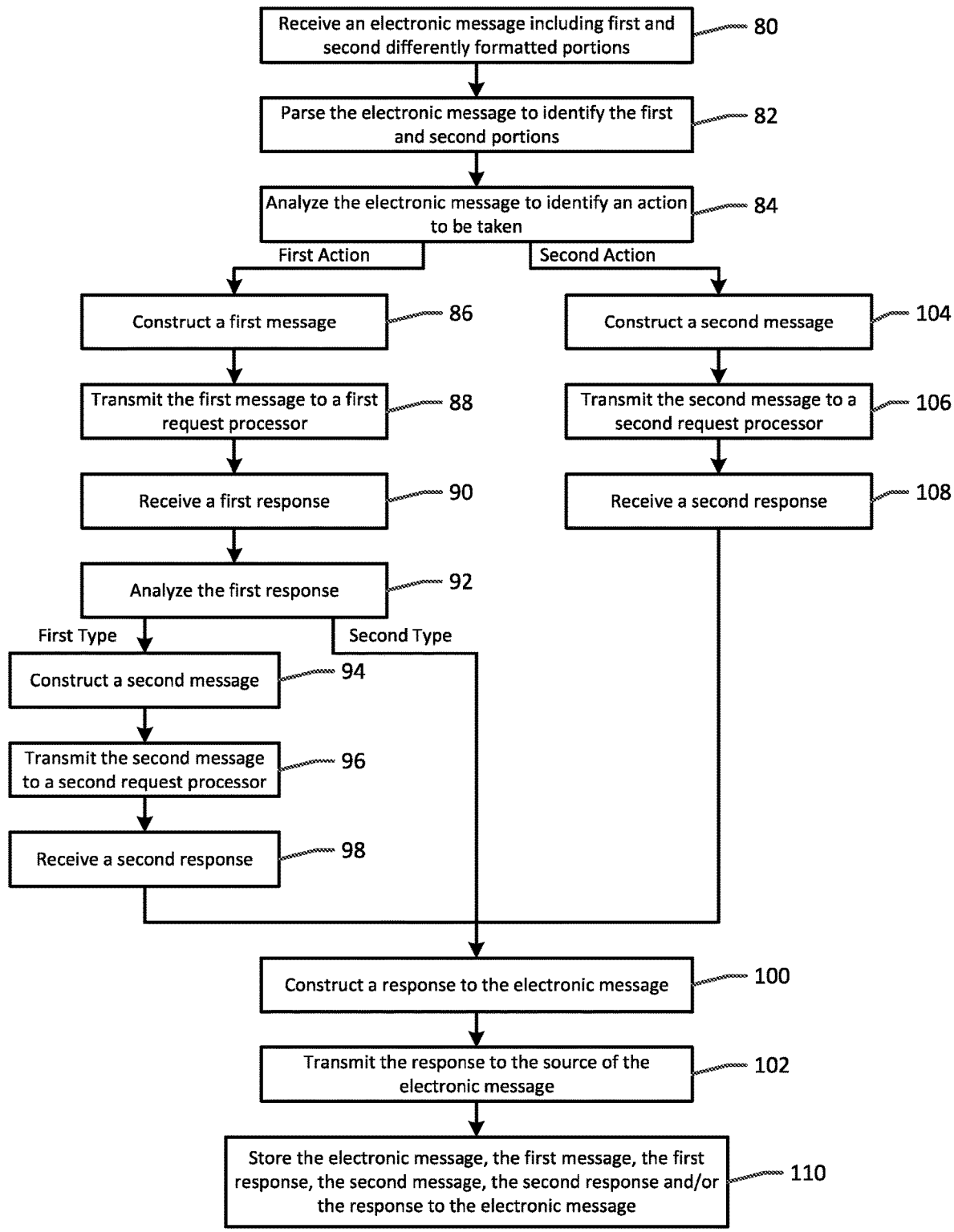
Figure 9:
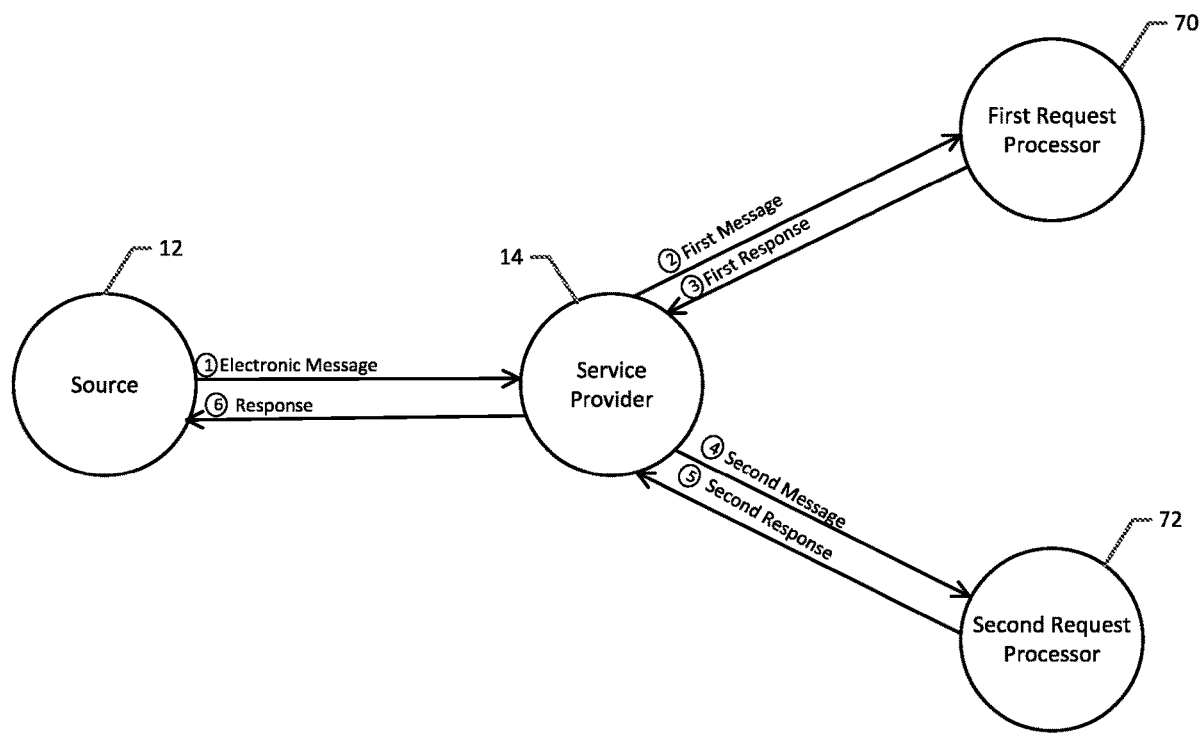

Having thus described certain embodiments of the invention in general terms, reference will now be made to the accompanying drawings, which are not necessarily drawn to scale, and wherein:

FIG. 1 is a diagram of a system configured to process and exchange electronic messages in accordance with an example embodiment of the present invention;

FIG. 2 is a block diagram of a computing device that may be specifically configured in accordance with an example embodiment of the present invention;

FIG. 3 is a flow chart illustrating the operations performed, such as by the switch of FIG. 1 embodied by the computing device of FIG. 2, in accordance with an example embodiment of the present invention;

FIG. 4 is an example of an electronic message that is processed in accordance with an example embodiment of the present invention;

FIG. 5 is a signal flow diagram illustrating the messages exchanged in conjunction with a rejection of a reimbursement request in accordance with an example embodiment of the present invention;

FIG. 6 is a signal flow diagram illustrating the messages exchanged in conjunction with the processing of an electronic message having a second portion that triggers communication with another entity in accordance with an example embodiment of the present invention;

FIG. 7 is a diagram of a system configured to parse an electronic message and to construct multiple differently prioritized messages therefrom in accordance with another example embodiment of the present invention;

FIG. 8 is a flow chart illustrating the operations performed, such as by the switch of FIG. 7 embodied by the computing device of FIG. 2, in accordance with another example embodiment of the present invention; and FIG. 9 is a signal flow diagram illustrating the messages exchanged in conjunction with the processing of either a pharmacy claim or a medical claim in accordance with another example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, computing device, and computer program product are provided in accordance with an example embodiment in order to process electronic messages having a first portion with a predefined format and a second, differently formatted second portion that includes additional information by transforming the additional information, constructing other messages based thereupon and updating a database including one or more of the messages. The first portion of the electronic message may provide the information typically provided by a structured message. By providing for the inclusion of the additional information along with the first portion in the same electronic message, however, the electronic message may efficiently convey other types of information from a source to a recipient, thereby reducing or at least limiting any increase in the number of messages transmitted between the source and the recipient in order to convey the additional information which, in turn, reduces or limits any increase in the load otherwise imposed upon the network that supports the delivery of the electronic messages. Moreover, the additional information included in the electronic message may facilitate the provision of additional functionality and services by the recipient or others in response to the electronic message that was not previously available. For example, the method, computing device and computer program product of an example embodiment permit sufficient information to be included within the message such that some messages that otherwise must be submitted in batch format so as to generate a delayed response may now be submitted and processed and, as a result, generate a response in real time or near real time, thereby avoiding the delays and additional storage and processing requirements necessitated by batch processing and facilitating an enhanced user experience as a result of the timely responses for each of the different types of messages.

By way of example, a system 10 that is configured to communicate and process electronic messages having a first portion with a predefined format and a second, differently formatted second portion that includes additional information is depicted in FIG. 1. As shown, the electronic message may be provided by a source 12 and received by a service provider 14, such as a switch. After parsing and differently processing the different portions of the electronic message provided by the source, the service provider is configured to communicate with a request processor 16 and, in some embodiments, with other entities 18. Although the method, computing device and computer program product may be employed in various applications, the method, computing device and computer program product of example embodiments are employed in conjunction with electronic messages conveying additional information that communicated and processed in conjunction with telecommunication applications, content delivery and provisioning and healthcare applications, such as in conjunction with the submission and evaluation of prescription claims, such as a prescription claim submitted by a pharmacy management system, and the provision of feedback regarding reimbursement of the pharmacy by a claims payor, e.g., an insurance company or the like, to name but a few.

The service provider 14 may be configured in various manners, but, in embodiment, the service provider includes a computing device 20 configured to parse and differently process different portions of an electronic message and may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the request processor 16 and other entities 18. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database 30 includes information accessed and stored by the processing circuitry 22 to facilitate the operations of the service provider 14. For example, the database 30 may comprise a series of tables configured to store information regarding different types of messages and/or portions of different types of messages as described below.

The operations performed by the computing device 20 embodied by the service provider 14 are depicted in an example embodiment in FIG. 3. As shown, the computing device of an example embodiment, such as the communication interface 28, the processing circuitry 22, the processor 24 or the like, is configured to receive an electronic message from a source as shown in block 40 of FIG. 3. Although different types of electronic messages may be received depending upon the application, the electronic message may be an electronic healthcare request, such as a prescription claim request, prescription reversal request, predetermination of benefits request or the like, is generated by a pharmacy management system and is directed to the service provider, e.g., switch, for processing prior to submission to a request processor 16 in the form of a claims processor for adjudication. In this embodiment, the electronic healthcare request typically includes information that identifies the patient, the medication, product, or service being requested, the healthcare provider (either the prescriber, pharmacy or both), and the benefit plan, insurer, or government-funded payor for the patient.

A pharmacy management system may be operated by a pharmacy in order to track the fulfillment of the various prescriptions and to submit claims for reimbursement, requests for the predetermination of benefits or the like via the service provider 14 to various claim payors in order to facilitate reimbursement of the pharmacy for the cost of the medications dispensed. The service provider, in turn, communicates with one or more claims processors in order to obtain an analysis of the claim or other request submitted by the pharmacy management system. In the context of a predetermination of benefits request, the claims processor responds with an indication as to whether or not the claim will be reimbursed and, if so, to what extent and the service provider, in turn, provides this information to the pharmacy management system. Armed with the information regarding the reimbursement expected for a particular prescription, a pharmacy management system may direct fulfillment of the prescription and/or communication between a pharmacist and a patient regarding the cost of the prescription that is not reimbursable and that must be borne by the patient. As described below, the system of this example embodiment may also include another entity 18 in the form of a medical claims processor in communication with the service provider and configured to provide information regarding the reimbursement of medical services provided at the pharmacy, such as by a pharmacist, thereby permitting integration of claims for reimbursement, requests for the predetermination of benefits or the like provided by a pharmacy management system for both prescription claims and medical services claims in order to increase the overall system efficiency and to reduce the overall load upon the network supporting the message traffic.

Regardless of the type of electronic message, the electronic message includes a first portion formatted in accordance with a first predefined format and a second portion formatted differently than the first predefined portion. As shown in block 42, the computing device 20, such as the processing circuitry 22, the processor 24 or the like, is configured to parse the electronic message so as to separately identify the first and second portions. The content provided by the first and second portions and the particular formats of the first and second portions may vary depending upon the application and the corresponding type of the electronic message. In the context of an electronic healthcare request, however, one example of an electronic message is depicted in FIG. 4. The electronic healthcare request 60 of this example embodiment includes a wrapper as defined by the header field 62. The header provides various information with respect to the electronic healthcare request and serves to secure the electronic healthcare request such that a recipient can access the payload of the electronic healthcare request only after having satisfied the security requirements imposed by the header. The electronic healthcare request of this example embodiment includes a qualifier 64, such as a flag. A qualifier of an example embodiment has a plurality of different predefined values with each predefined value representative of a different type of electronic healthcare message. The electronic healthcare message of the example embodiment also includes a first portion 66 formatted in accordance with a first predefined format and a second portion 68 formatted differently than the first predefined format. Although the first predefined format may vary from one electronic healthcare message to another, the first portion of an electronic healthcare request of an example embodiment is formatted in accordance with the National Council for Prescription Drug Programs (NCPDP) telecommunications standard that is utilized in conjunction with the submission of prescription claim requests. In contrast, the second portion of the electronic healthcare request may have any of a variety of different formats with the format of the second portion being different that the first predefined format. The qualifier field may include different values indicative of the presence or absence of the second portion, the presence or absence of the first portion as well as an indication as to whether or not the first portion is formatted in accordance with NCPDP.

Following parsing of the electronic message, the computing device 20 embodied by the service provider 14, such as the processing circuitry 22, the processor 24 or the like, is configured to analyze the second portion of the electronic message to identify an action to be taken based thereupon. See block 44 of FIG. 3. With respect to an electronic healthcare message 60 of the type depicted in FIG. 4, for example, the computing device, such as the processing circuitry, the processor or the like, is configured to analyze the qualifier field to determine the presence or absence of the first and second portions and, in some embodiments, the first predefined format utilized for the first portion. In addition, the second portion of the electronic message is analyzed in order to identify a predefined type of information included in the second portion and, in turn, to identify an action to be taken based thereupon. Examples of different predefined types of information included in the second portion and the ensuing actions to be taken based upon the analysis of the second portion of the electronic message are provided below.

After having parsed the electronic message, the computing device 20, such as the processing circuitry 22, the processor 24, the communication interface 28 or the like, is configured to construct a first message to be transmitted to the request processor 16. See block 46 of FIG. 3. The first message is based at least in part upon the first portion of the electronic message and, in some embodiments, includes the first portion from the electronic message received from the source. In the context of an electronic healthcare request, the first message that is constructed may be a prescription reimbursement request or a predetermination of benefits request that is transmitted to a claims processor, such as a claims processor of a payor of prescription claims, e.g., an insurance company. A claims processor is configured to analyze the prescription reimbursement request or the predetermination of benefits request based upon the insurance or other payor rules and to provide a response indicative of whether coverage is provided for the prescription claim that is the subject of the request and, if so, the reimbursement amount that will be paid by the payor to the pharmacy upon dispensation of the medicine that is the subject of the prescription. As noted above, the first message that is transmitted to the claim processor in this example embodiment is based at least in part upon the first portion of the electronic healthcare request and, in some embodiments, includes the first portion of the electronic healthcare request since claims processors may be configured to interpret and analyze a prescription reimbursement request or a predetermination of benefits request submitted in accordance with the first predefined format, such as NCPDP, and do not correspondingly interpret and analyze prescription reimbursement requests or predetermination of benefits requests submitted in accordance with a different format.

Based upon the first message including the first portion, the computing device 20, such as the processing circuitry 22, the processor 24 or the like, is configured to receive a first response from the request processor 16 and, based upon the first response from the request processor, to construct a response to the electronic message to be provided, such as to the source. See blocks 48 and 50 of FIG. 3. As such, the source can receive information, such as feedback or the like, based upon the first portion of the electronic message from the request processor with the computing device embodied by the service provider 14 serving to appropriately configure and direct the first message and the response thereto between the request processor and the source.

In the context of an electronic healthcare request, the first response may provide an indication as to the coverage provided by the claims payor for the prescription that is the subject of the prescription reimbursement request or the predetermination of benefits request. If coverage is provided, the first response may provide a reimbursement amount indicative of the monetary amount for which the pharmacy will be reimbursed by the claims payor in response to dispensation of the medicine that is the subject of the prescription. If coverage is not provided, however, the first response may provide an indication as to the reason for denial of the prescription reimbursement request or the predetermination of benefits request. Based upon the first response from the claims processor, the computing device of this example embodiment causes a response to the electronic healthcare request to be provided, such as to the pharmacy management system. Thus, the pharmacy management system is provided with a response that includes the information provided by the claims processor, such as an indication as to whether the claims payor provides coverage for the prescription reimbursement request or the predetermination of benefits request and, if so, the reimbursement amount associated therewith. Based upon the response to the electronic healthcare request provided by the service provider 14, a pharmacist may proceed to dispense the medication that is the subject of the prescription in an instance in which the pharmacy is to be fully reimbursed by the claims payor or may counsel the patient as to the out-of-pocket amount that the payor must personally pay prior to dispensing the medication in an instance in which the reimbursement amount is less than the full cost of the medication.

As shown in block 52, the computing device 20, such as the processing circuitry 22, the processor 24, the database 30 or the like, is configured to store one or more of the electronic message, the first message to the request processor 16, the first response from the request processor and/or the response to the electronic message in the database. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

Based upon the parsing of the electronic message and the analysis of the second portion of the electronic message, the service provider 14 is configured to provide additional functionality based upon the second portion of the electronic message. For example, based upon an analysis of the second portion of the electronic message, the first message transmitted to the request processor 16 or the response to the electronic message that is provided to the source may be modified, such as by including additional or different information. Alternatively, based upon the analysis of the second portion of the electronic message, an additional message may be transmitted to an entity 18 different than the request processor and different than the source of the electronic message. For example, the other entity to which the additional message is transmitted may be a medical claims payor such that the computing device 20 embodied by the service provider may not only support prescription claim requests, but also medical claim requests, notwithstanding the fact that medical claim requests are differently formatted than prescription claim requests.

With respect to the modification of the electronic message, in an instance in which the analysis of the second portion of the electronic message identifies a system edit instruction, the computing device 20, such as the processing circuitry 22, the processor 24 or the like, is configured to modify the first portion in accordance with the system edit instruction prior to transmitting the first message that is based upon and, in some embodiments, includes the first portion to the request processor 16. Based upon the modification to the first portion upon which the first message to the request processor is based, the actions taken by the request processor and the first response provided thereby may be correspondingly modified.

By way of example, the second portion of an electronic healthcare message may include a system edit instruction which causes the first message to the claims processor and/or the response to the pharmacy management system to be modified. As different types of system edit instructions may be included within the second portion of the electronic healthcare message, the first message to the claims processor and/or the response to the pharmacy management system may be differently modified depending upon the particular type of system edit instruction included within the second portion of the electronic healthcare message. In this example embodiment, the computing device 20, such as the processing circuitry 22, the processor 24 or the like, is configured to analyze the second portion of the electronic healthcare message and to identify a system edit instruction. In one embodiment, the computing device, such as the processing circuitry, the processor or the like, is configured to modify the first portion parsed from the electronic healthcare request in accordance with the system edit instruction, that is, in a manner defined by the system edit instruction, prior to transmitting the first message, including the first portion, to the claims processor. The first portion may be modified in various manners depending upon the system edit instruction including, for example, modification of the first portion to include additional information, such as an indication of the species of the patient, an indication of the language spoken by the patient, information regarding the role of the pharmacy personnel submitting the prescription reimbursement request or the predetermination of benefits request to permit requests relating to the dispensing of opioids or other risk evaluation and mitigation strategies (REMS) medications that are dependent upon authorization by certain pharmacy personnel, such as a pharmacist, to be processed, or the like.

As another example of the action taken with respect to a second portion of an electronic healthcare message in the form of a prescription reimbursement request that includes a system edit instruction, reference is made to the signal flow diagram of FIG. 5. In this regard, the computing device 20, such as the processing circuitry 22, the processor 24 or the like, is configured to analyze the second portion of the electronic healthcare message so as to identify a system edit instruction as well as information regarding a cost paid by the pharmacy for the respective medication that is the subject of the prescription claim request. See signal flow 1 of FIG. 5. As described above, the computing device, such as the processing circuitry, the processor, the communication interface 28 or the like, constructs the first message which is then transmitted to the request processor 16 as shown in signal flow 2. In response, the computing device, such as the processing circuitry, the processor, the communication interface or the like, receives a first response from the request processor including a reimbursement amount, that is, an amount that the prescription claims payor will reimburse the pharmacy upon dispensing of the respective medication. See signal flow 3 in FIG. 5.

In this example embodiment, the computing device 20, such as the processing circuitry 22, the processor 24 or the like, is configured to construct a response to the electronic healthcare message to be provided to, for example, the pharmacy management system by first identifying the reimbursement amount for the prescription claim for the respective medication from the response from the request processor 16 and then comparing the reimbursement amount to the corresponding cost paid by the pharmacy. In an instance in which the cost paid by the pharmacy exceeds the reimbursement amount for the prescription claim, the computing device, such as the processing circuitry, the processor, the communication interface 28 or the like, is configured to cause the response to the electronic healthcare message that is provided to the pharmacy management system to include a rejection of the prescription claim as shown in signal flow 4 of FIG. 5. Thus, in an instance in which the response from the request processor 16 following adjudication of the prescription reimbursement request indicates that the prescription claim will not be paid or will be paid at a reimbursement amount that is less than the cost to the pharmacy of the medication, the response is modified from an indication that the prescription claim will be paid at the reimbursement amount to an indication that the prescription claim is rejected.

As such, the pharmacy management system need not separately analyze the reimbursement amount provided by the request processor 16, determine that the reimbursement amount is less that then cost to the pharmacy for the respective medication and, in turn, transmit another electronic healthcare request in the form of a reversal in order to reverse the prior adjudication provided by the request processor. Consequently, the computing device 20 of this example embodiment reduces the messaging traffic supported by the network, thereby advantageously reducing the network load and reducing the processing demand upon the pharmacy management system and the request processor by reducing the number of separate messages that must be processed thereby. In this example embodiment, in an instance in which the cost paid by the pharmacy exceeds the reimbursement amount for the prescription claim, the computing device of an example embodiment, such as the processing circuitry 22, the processor 24, the communication interface 28 or the like, is also configured to cause a reversal message to be transmitted to the request processor to cause the medication to be eliminated from the prescription claim submitted by the pharmacy management system. See signal flow 5 of FIG. 5. In this example embodiment, the database 30 may be configured to not only store the first message, the first response and the response to the source of the electronic message, but the database may also store the reversal message, such as in a respective database table, so as to maintain complete record of the messaging triggered by the electronic message.

As another example of an action taken based upon a second portion of an electronic message, an additional message may be transmitted to a different entity 18. In this regard, in an instance in which the analysis of the second portion of the electronic message identifies a predefined type of information included therewithin, the computing device 20 of an example embodiment, such as the processing circuitry 22, the processor 24 or the like, is configured to transform the information included within the second portion so as to have a predefined format, different than the first predefined format, and to cause a second message in the predefined format to be transmitted to the different entity. Thus, the analysis of the second portion of the electronic message of this embodiment permits the service provider 14 to generate and transmit two different messages, one to the request processor 16 and the other to other entity, with each message formatted differently, albeit appropriately for the request processor or the other entity, thereby facilitating efficient communication by the source 12 with the request processor and the other entity.

By way of example, FIG. 6 depicts the transmission of an additional message to another entity 18, such as a medical claims processor, in response to receipt and processing of an electronic healthcare message. In this example embodiment, the second portion of the electronic healthcare message includes a predefined type of information in the form of information regarding a medical claim, which may be separately processed by the service provider 14 and as such, the electronic healthcare message of this example embodiment effectively conveys information regarding both a medical claim and a prescription claim, which are formatted differently and are typically processed differently via two different message streams. Thus, the computing device 20 of this example embodiment again increases the efficiency with which prescription claims and medical claims are evaluated by reducing message traffic, such as by reducing the instances in which separate messages must be processed by the claims processor, the medical claims processor or the like.

In this example embodiment, the electronic healthcare message that is received via signal flow 1 of FIG. 6 from the pharmacy management system includes the first portion typically formatted in accordance with NCPDP, including information regarding a prescription claims request, such as a prescription reimbursement request or a predetermination of benefits request, and a second portion formatted differently than the first portion and including a predefined type of information, such as information regarding a medical claim. Various types of data elements may be submitted by the pharmacy management system within the second portion of the electronic healthcare message representative of different medical procedures performed at a pharmacy, such as by a pharmacist. The medical procedures include, but are not limited to, vaccinations, immunizations, flu shots, diabetic testing, medical management services and an increasing number of other medical procedures that pharmacists are authorized to perform.

As described above, the computing device 20 of this example embodiment, such as the processing circuitry 22, the processor 24 or the like, is configured to cause a first message that is based at least in part upon the first portion to be transmitted as shown by signal flow 2 to the request processor 16 in order to analyze a prescription claim request and to receive a first response from the request processor as shown by signal flow 3. The communication between service provider 14 and the request processor is based upon the first portion of the electronic healthcare request relating to a prescription claim request and not the second portion of the electronic healthcare message that includes information regarding a medical claim request. As shown in FIG. 6, the computing device, such as the processing circuitry, the processor or the like, is also configured to transform the information included in the second portion, such as by constructing a medical claim in a predefined format, different than the first predefined format. Although the medical claim may have various formats, the medical claim may be an 837 claim constructed in accordance with an example embodiment to have an X12 format consistent with medical claims processing. The computing device, such as the processing circuitry, the processor, the communication interface 28 or the like, is also configured to cause the medical claim in a predefined format, such as the X12 format, to be transmitted as a second message to a medical claims processor of or associated with the medical claims payor, such as an insurance company or the like. See signal flow 4 of FIG. 6. The medical claims processor may, in turn, evaluate the medical claim and may provide a second response at signal flow 5 indicating whether the medical claim will be paid and, if so, the reimbursement amount for the medical claim or, if not, a reason for which the medical claim request was denied in whole or in part. As shown by signal flow 6 of FIG. 6, the computing device, such as the processing circuitry, the processor, the communication interface or the like, may, in turn, provide a response to the pharmacy management system including, for example, the response provided by the request processor and/or the response provided by the medical claims processor. In this example embodiment, the database 30 may be configured to not only store the first message, the first response and the response to the source of the electronic message, but the database may also store the second message and the second response, such as in respective database tables, so as to maintain complete record of the messaging triggered by the electronic message.

As yet another example of an action taken based upon a second portion of an electronic message, the response to the electronic message may be modified in an instance in which the analysis of the second portion of the electronic message, and/or the analysis of the first portion of the electronic message, the first response and/or the second response, so as to identify a document to be provided, such as to the source 12. In this regard, the computing device 20, such as the processing circuitry 22, the processor 24, the communication interface 28 or the like, is configured to cause the response to the electronic message that is provided to be dynamically constructed based upon information from the first or second portion of the electronic message, the first response from the request processor or the second response from the entity so as to include an access mechanism, such as an address, e.g., a uniform resource locator (URL), from which a document may be accessed. Upon receipt, the source may access the access mechanism, such as by actuating the URL, in order to retrieve the document. As such, the document may be readily reviewed and/or printed or otherwise saved without much effort by the source.

For example, in the healthcare context, the action taken as a result of the analysis of the second portion of the electronic healthcare request, and/or as a result of the analysis of the first portion of the electronic message, the first response and/or the second response, facilitates the printing by or other provision of documentation associated with a prescription to a pharmacy, and as applicable, to a patient of the pharmacy. Such documentation associated with the prescription may be required in some instances as a condition associated with the dispensing of the medication that is the subject of the prescription, such as to provide information regarding side effects, information regarding dangers associated with concurrently taking other medication or the like. Typically, the provision of such documentation to patients has been time consuming on behalf of the pharmacy such that the provision of such documentation according to this example embodiment greatly increases the efficiency with which the documentation may be provided as well as the reliability associated with the provision of the documentation.

As a result of the inclusion of a second portion within the electronic message that can include additional and/or different information from that which must be included within the first portion, the computing device 20, such as the processing circuitry 22, the processor 24, the communication interface 28 or the like, is configured to provide ready access to documentation associated with the prescription including, for example, patient education resources, medication adherence information, patient assistance program opportunities, etc. that has not heretofore been included within the messaging directed to the pharmacy. In this regard, the inclusion of an access mechanism, such as an address, e.g., a URL, in the response to the pharmacy permits patient education resources, medication adherence information, patient assistance program opportunities and other documents to be readily accessed. In this example embodiment, the computing device 20, such as the processing circuitry 22, the processor 24 or the like, is configured to analyze the second portion of the electronic healthcare message, and/or the first portion of the electronic message, the first response and/or the second response, so as to identify a document to be provided by a pharmacy to its patient. For example, business rules may be applied to the second portion of the electronic healthcare message in order to determine that a document is to be provided. In this regard, the computing device, such as the processing circuitry, the processor, the communication interface 28 or the like, is also configured to cause the response to the electronic healthcare message that is provided to the pharmacy management system to be dynamically constructed based upon information from the first or second portion of the electronic message, the first response from the request processor or the second response from the entity so as to include an access mechanism, such as an address, accessible by the pharmacy or by a patient of the pharmacy, in order to retrieve the document, such as for printing, review, storage or the like. Although the access mechanism associated with the document may be provided in various manners, the access mechanism of an example embodiment is an address, such as a URL, that is associated with and links to the document upon actuation by a pharmacist, a pharmacy technician, a patient or the like. In this example embodiment, the response to the electronic healthcare message that is provided to the pharmacy management system may be modified so as to include not only the response from the request processor 16, but also the access mechanism, such as the address, e.g., URL, associated with the document. Thus, a pharmacist or a patient of the pharmacy may readily retrieve and review the documentation. The documentation may be stored, such as in memory 26, database 30 or another storage device. In addition, the computing device, such as the processing circuitry, the processor or the like, may be configured to control access to the document and to maintain a record of access to the document with such record stored, for example, by the memory, database or the like.

In yet other embodiments, the action to be taken in the form of transmission of additional messages based upon the electronic message may be dependent upon the role of a person associated with the electronic message, such as the person that provided information conveyed via the electronic message and/or the person who authorized transmission of the electronic message and/or with which the electronic message is otherwise associated. In this example embodiment, the analysis of the second portion of the electronic message by the computing device 20, such as the processing circuitry 22, the processor 24 or the like, is configured to identify a role indicator. As such, the action to be taken based upon the analysis of the second portion of the electronic message is based upon the role indicator in this example embodiment. For example, the computing device, such as the processing circuitry, the processor or the like, may be configured to condition transmission of the first message to the request processor 16 or the provision of the response to the electronic message based upon the role indicator having a predefined value. Thus, the submission of the electronic message by an individual having a certain role may cause the transmission of the first message and the provision of the response to the electronic message, but the submission on the same electronic message by person of a different role, that is, having a role indicator that does not have the predefined value, may be processed in a manner that prevents the transmission of the first message to the request processor or the provision of the response to the electronic message. Thus, the analysis of the second portion of the electronic message in accordance with this example embodiment permits the behavior of the service provider 14 to be controlled based upon the role indicator.

In another example embodiment, a method, computing device, and computer program product are provided in accordance in order to process electronic messages having a first portion with a predefined format and a second, differently formatted second portion that includes additional information by analyzing an electronic message, constructing other differently prioritized messages based thereupon and updating a database including one or more of the messages. In this example embodiment, a system 10 that is configured to communicate and process electronic messages having a first portion with a predefined format and a second, differently formatted second portion that includes additional information is depicted in FIG. 7. As shown, the electronic message may be provided by a source 12 and received by a service provider 14, such as a switch as described above in conjunction with FIG. 2. After parsing the different portions of the electronic message provided by the source and constructing one or more differently prioritized messages based thereupon, the service provider is configured to communicate with a first request processor 70 and, in some embodiments, with a second request processor 72. In some embodiments, the second request processor is different than the first request processor. Although the method, computing device and computer program product may be employed in various applications, the method, computing device and computer program product of example embodiments are employed in conjunction with electronic messages conveying additional information that is communicated and processed in conjunction with telecommunication applications, content delivery and provisioning and healthcare applications, such as in conjunction with the submission and evaluation of prescription and/or medical claims, such as a prescription claim and/or a medical claim submitted by a pharmacy management system, and the provision of feedback regarding reimbursement of the pharmacy by a claims payor, e.g., an insurance company or the like, to name but a few. In an application involving the submission and evaluation of prescription and/or medical claims, the first and second request processors may both be claims processors configured to adjudicate claims and to provide the service provider with the results of the adjudication. In this regard, the first request processor may be a prescription claims processor for adjudicating prescription claims and the second request processor may be a medical claims processor for adjudicating medical claims.

The operations performed by the computing device 20 embodied by the service provider 14 are depicted in accordance with this example embodiment in FIG. 8. As shown in block 80 of FIG. 8, the computing device of an example embodiment, such as the processing circuitry 22, the processor 24, the communication interface 28 or the like, is configured to receive an electronic message from a source 12. Different types of electronic messages may be received depending upon the application. As described above, however, the electronic message may be an electronic healthcare message, such as a prescription claim, e.g., a prescription reimbursement request, a prescription reversal request, a predetermination of prescription benefits request or the like, or a medical claim, e.g., a medical reimbursement request, a medical reversal request, a predetermination of medical benefits request or the like, generated by the source, such as a pharmacy management system, and directed to the service provider, e.g., a switch, for processing and adjudication. In this embodiment, the electronic healthcare message typically includes information that identifies the patient, the medication, product, or service being requested, the healthcare provider (either the prescriber, pharmacy or both), and the benefit plan, insurer, or government-funded payor for the patient.

A pharmacy management system may be operated by a pharmacy in order to track the fulfillment of the various prescriptions and to submit prescription claims for reimbursement, requests for the predetermination of prescription benefits or the like via the service provider 14 to various claim processors in order to obtain an analysis of the prescription claim or other request submitted by the pharmacy management system and to identify, for example, the patient's out of pocket costs, typically in real time or near real time. In the context of a predetermination of prescription benefits request, the claims processor responds with an indication as to whether or not the prescription claim will be reimbursed and, if so, to what extent and the service provider, in turn, provides this information to the pharmacy management system.

In some situations, a pharmacy may be unaware as to whether a prescription or service is to be paid, in whole or in part, by a prescription benefits plan or other prescription insurance plan of the patient or by a medical insurance plan of the patient or whether the patient has no insurance coverage for the prescription or service. By way of example, certain medications, such as specialty medications that are quite expensive, be they for immunizations or other purposes, may not always be covered via the prescription benefits plan and may, instead, be covered, in some instances, by the medical insurance plan of the patient. However, the pharmacy may be unaware as to the particular insurance plan or benefits coverage under which the medication or service is to be covered. While a pharmacy management system may receive a relatively quick response from a prescription claims processor as to whether a pharmacy claim, such as a prescription reimbursement request or a predetermination of prescription benefits request, the pharmacy management system does not generally receive a similarly quick response with respect to medical claims, such as medical reimbursement requests or a predetermination of medical benefits request. Instead, a pharmacy management system generally submits medical claims in a batch process for subsequent claims processing and may not receive a response following the adjudication of the medical claims for some period of time, such as days or weeks. As such, in an instance in which a medication or other service is not covered by the prescription benefits plan or other prescription insurance plan of a patient, the pharmacy will not generally learn in real time or near real time, such as while the patient is at the pharmacy, as to whether the medication or other service will be covered by the medical insurance plan of the patient and, if so, to what extent the cost of the medication or service is to be covered. Moreover, in an instance in which a medication or other service is not covered by the prescription benefits plan or other prescription insurance plan of the patient, the message returned from the prescription claims processor denying coverage and the subsequent efforts to include a medical claim for the medication or service in a subsequent batch of medical claims may undesirably increase the demand on processing and memory resources of the pharmacy management system due to, for example, the receipt of the message denying coverage and the construction and subsequent tracking of the batch of medical claims. In accordance with an example embodiment, however, the electronic message provided by the source 12 and received by the computing device 20 of the service provider 14 permits a claim to be adjudicated first as a prescription claim and then, in some circumstances, as a medical claim. Thus, a claim may be fully adjudicated without undesirably increasing the load upon the network by limiting or avoiding additional message traffic with the source, even in an instance in which the source is unaware of whether the claims should be adjudicated as a prescription claim or a medical claim.

In one embodiment, the source 12, such as a pharmacy management system, may maintain a listing of medications for which coverage may be provided either by a patient's prescription benefits plan or prescription insurance plan or by a patient's medical insurance plan. In such an instance, the source may be unaware of the type of claim to be submitted for dispensation of a medication included in the listing and, as such, may submit an electronic message of the type described herein in an instance in which the medication is included in the listing. This listing of medications may be updated over the course of time.

Regardless of the type of electronic message, the electronic message includes a first portion formatted in accordance with a first predefined format and a second portion formatted differently than the first predefined portion. As shown in block 82, the computing device 20, such as the processing circuitry 22, the processor 24 or the like, is configured to parse the electronic message so as to separately identify the first and second portions. The content provided by the first and second portions and the particular formats of the first and second portions may vary depending upon the application and the corresponding type of the electronic message. In the context of an electronic healthcare message, however, one example of an electronic message is depicted in FIG. 4 and described above. The electronic healthcare message 60 of this example embodiment includes a wrapper as defined by the header field 62. The header provides various information with respect to the electronic healthcare message, such as by identifying the electronic healthcare message to be of the type that includes a first portion formatted in accordance with a first predefined format and a second portion formatted differently than the first predefined portion. As noted above, the header may also serve to secure the electronic healthcare message such that a recipient can access the payload of the electronic healthcare message only after having satisfied the security requirements imposed by the header.

The electronic healthcare message 60 of this example embodiment includes a qualifier field 64, such as a flag. A qualifier field of an example embodiment has a plurality of different predefined values with each predefined value representative of a different type of electronic healthcare message. For example, the qualifier field may have a first value to identify the electronic healthcare message to be related to a prescription claim, such as a prescription reimbursement request, a predetermination of prescription benefits request, a prescription reversal request or the like. The qualifier field of this example embodiment may also have a second value to identify the electronic healthcare message to be related to a medical claim, such as a medical reimbursement request, a predetermination of medical benefits request, a medical reversal request or the like.

As described above, the electronic healthcare message of the example embodiment also includes a first portion 66 formatted in accordance with a first predefined format and a second portion 68 formatted differently than the first predefined format. The qualifier field 64 may include different values indicative of the presence or absence of the second portion, the presence or absence of the first portion as well as an indication as to whether or not the first portion is formatted in accordance with NCPDP.

Following parsing of the electronic message, the computing device 20 embodied by the service provider 14, such as the processing circuitry 22, the processor 24 or the like, is configured to analyze the electronic message to identify an action to be taken based thereupon. See block 84 of FIG. 8. With respect to an electronic healthcare message 60 of the type depicted in FIG. 4, for example, the computing device, such as the processing circuitry, the processor or the like, is configured to analyze the qualifier field 64 to determine the action to be taken. For example, the analysis of the qualifier field may determine whether the electronic healthcare message relates to a prescription claim or a medical claim. Based upon a determination as to whether the electronic healthcare message relates to a prescription claim or to a medical claim, the action to be taken in response to the electronic healthcare message, may be determined since different actions are taken in accordance with an example embodiment depending upon whether the electronic healthcare message relates to a prescription claim or to a medical claim.

After having parsed the electronic message and in an instance a determination is made that a first action is to be taken, such as a result of qualifier field 64 indicating that the electronic healthcare message relates to a prescription claim (as opposed to a medical claim), the computing device 20, such as the processing circuitry 22, the processor 24, the communication interface 28 or the like, is configured to construct a first message to be transmitted to the request processor 16. See block 86 of FIG. 8. The first message is based at least in part upon the first portion of the electronic message and, in some embodiments, includes the first portion from the electronic message received from the source. In the context of an electronic healthcare message, the first message that is constructed may be a prescription claim, such as a prescription reimbursement request or a predetermination of prescription benefits request. The computing device, such as the processing circuitry, the processor, the communication interface or the like, is therefore also configured to transmit the first message to the first claims processor 16, such as a prescription claims processor of a payor of prescription claims, e.g., an insurance company. See block 88 of FIG. 8. A prescription claims processor is configured to analyze the prescription claim based upon the insurance or other payor rules and to provide a response indicative of whether coverage is provided for the prescription claim that is the subject of the first message and, if so, the reimbursement amount that will be paid by the payor to the pharmacy upon dispensation of the medication that is the subject of the prescription. As noted above, the first message that is transmitted to the first claims processor in this example embodiment is based at least in part upon the first portion of the electronic healthcare message and, in some embodiments, includes the first portion of the electronic healthcare message since prescription claims processors may be configured to interpret and analyze a prescription claim submitted in accordance with the first predefined format, such as NCPDP, and do not correspondingly interpret and analyze prescription claims submitted in accordance with a different format.

Based upon the first message, the computing device 20, such as the processing circuitry 22, the processor 24, the communication interface 28 or the like, is configured to receive a first response from the first request processor 70. See block 90 of FIG. 8. The computing device, such as the processing circuitry, the processor or the like, is also configured to analyze the first response to determine the type of response, such as by determining whether the first response is of a first type or a second type. See block 92 of FIG. 8. In the context of an electronic healthcare message and, more particularly, a prescription claim, the first response may provide an indication as to the coverage, if any, provided by the claims payor for the medication that is the subject of the prescription claim. In one embodiment, the first response of the first type indicates that coverage is not provided by a prescription benefits plan or other prescription insurance plan of the patient. In this situation, the first response may provide an indication as to the reason for denial of the prescription claim. In this embodiment, the first response of the second type indicates that coverage is provided by a prescription benefits plan or other prescription insurance plan of the patient. In this situation, the first response may provide a reimbursement amount indicative of the monetary amount for which the pharmacy will be reimbursed by the claims payor in response to dispensation of the medication that is the subject of the prescription and, in some embodiments, an indication of the patient's out-of-pocket costs attributable to, for example, satisfaction of the patient's deductible, the patient's co-pay, etc. for the dispensation of the medication may also be provided.

Based upon the parsing of the electronic message and the analysis of the electronic message, such as the qualifier field 64, the service provider 14 is configured to provide additional functionality based upon the second portion of the electronic message. For example, in an instance in which the analysis of the first response determines that the first response is of the first type in which the prescription claim has been rejected, such as due to the medication that is the subject of the prescription claim not being covered by the prescription benefits plan, the prescription insurance plan or the like, the computing device 20 of an example embodiment is configured to subsequently evaluate the electronic message to determine if the electronic message, in fact, intends for a different action, that is, different than the first action, to be taken notwithstanding the qualifier field having provided an indication that the first action was to be taken. In regards to an electronic healthcare message that the qualifier field indicated to be related to a prescription claim (that has now been denied by a prescription claims processor), the computing device of this example embodiment is configured to respond to the rejection of the prescription claim with the construction and submission for adjudication of a medical claim for the same medication or service that was the subject of the prescription claim that has now been rejected. This construction and adjudication of a medical claim for the same medication or service that was the subject of the prescription claim that has now been rejected may be performed by the computing device of an example embodiment without the exchange of messages with the source 12 of the electronic message, such as a pharmacy management system, thereby reducing the number of messages via the network and processed by the service provider 14 and the source so as to avoid further loading of the network and to conserve processing resources of the service provider and the source.

In this example embodiment in which the first response is determined to be of the first type, the computing device 20, such as the processing circuitry 22, the processor 24 or the like, is configured to construct a second message. See block 94 of FIG. 8. In this scenario in which the analysis of the electronic message determines that a first action is to be taken, the construction and adjudication of the first message is prioritized relative to, that is, has a greater priority than, the construction and adjudication of the second message. In this regard, the first message is constructed and transmitted and the first response generated based upon the adjudication of the first message is completed prior to acting upon the second message.

In the context of an electronic healthcare message and in which the first type of the first response is a rejection of the prescription claim, the computing device 20 is configured to construct a second message in the form of a medical claim, such as a medical reimbursement request, the predetermination of medical benefits request or the like. The medical claim may be constructed from information included within the second portion 68 of the electronic healthcare message and, in some embodiments, in combination with some of the information from the first portion 66 of the electronic healthcare message. In this regard, the computing device, such as a processing circuitry 22, the processor 24 or the like, is configured to obtain data values from a plurality of predefined fields in the second portion of the electronic healthcare message and, in some embodiments, to combine the data values drawn from predefined fields of the second portion with data values from one or more fields of the first portion of electronic healthcare message to construct the medical claim and/or with one or more predefined values stored or accessible by the computing device. The second message may be constructed to have a different format than the first message since the first and second messages are transmitted to different request processors. In this regard, the second message that includes a medical claim may be constructed to have an X12 format, while the first message that includes a prescription claim may be constructed to have an NCPDP format.

The computing device 20, such as the processing circuitry 22, the processor 24, the communication interface 28 or the like, is also configured to transmit the second message to the second claims processor 72, such as a medical claims processor of a payor of medical claims, e.g., an insurance company. See block 96 of FIG. 8. While the embodiment of FIG. 8 depicts the second message to be constructed after the adjudication of the first message and after the analysis of the first response indicates that the first response is of the first type, the second message may be constructed at an earlier stage, such as concurrent with the construction of the first message or during adjudication of the first message, in other embodiments. Regardless of when the second message is constructed, the second message is not transmitted in this scenario (in an instance in which the initial analysis of the electronic message indicates that a first action is to be taken) until after the first message has been adjudicated and the first response is determined to be of the first type. As a result of the subsequent transmission and adjudication of the second message, the second message is of a lower priority than the first message regardless of when the second message is constructed. A medical claims processor is configured to analyze the medical claim based upon the insurance or other payor rules and to provide a response indicative of whether coverage is provided for the medical claim that is the subject of the second message and, if so, the reimbursement amount that will be paid by the payor to the pharmacy upon dispensation of the medication that is the subject of the prescription.

Based upon the second message, the computing device 20, such as the processing circuitry 22, the processor 24, the communication interface 28 or the like, is configured to receive a second response from the second request processor 72. See block 98 of FIG. 8. In the context of an electronic healthcare message and, more particularly, a medical claim, the second response may provide an indication as to the coverage, if any, provided by the claims payor for the medication that is the subject of the medical claim. In one embodiment, the second response of the first type indicates that coverage is not provided by a medical insurance plan of the patient. In this situation, the second response may provide an indication as to the reason for denial of the medical claim. In this embodiment, the second response of the second type indicates that coverage is provided by a medical insurance plan of the patient. In this situation, the second response may provide a reimbursement amount indicative of the monetary amount for which the pharmacy will be reimbursed by the claims payor in response to dispensation of the medication that is the subject of the medical claim and, in some embodiments, an indication of the patient's out-of-pocket costs attributable to, for example, satisfaction of the patient's deductible, the patient's co-pay, etc. for the dispensation of the medication may also be provided.

With reference to the operations depicted in FIG. 8, the electronic message is analyzed to identify the action to be taken in block 84. In the context of an electronic healthcare message, in an instance in which the analysis of the electronic healthcare message, such as an analysis of the qualifier field 64, indicates that a first action in the form of the adjudication of a prescription claim is to be taken, a prescription claim may be first submitted for adjudication as shown in blocks 86-92 and a medical claim may then be submitted for adjudication as shown in blocks 94-98 in an instance in which the prescription claim is rejected. However, in an instance in which the analysis of the electronic message indicates that a second action to be taken, the computing device follows a different work flow. In this regard, in the context of an electronic healthcare message, in an instance in which the analysis of the electronic healthcare message, such as an analysis of the qualifier field, indicates that a second action in the form of the adjudication of a medical claim is to be taken, the computing device 20, such as the processing circuitry 22, the processor 24 or the like, is configured to construct a second message. See block 104 of FIG. 8. In the context of an electronic healthcare message, the computing device is configured to construct a second message in the form of a medical claim, such as a medical reimbursement request, the predetermination of medical benefits request or the like. As noted above, the medical claim may be constructed from information included within the second portion 68 of the electronic healthcare message and, in some embodiments, in combination with some of the information from the first portion 66 of the electronic healthcare message.

The computing device 20, such as the processing circuitry 22, the processor 24, the communication interface 28 or the like, is also configured to transmit the second message to the second request processor 72, such as a medical claims processor of a payor of medical claims, e.g., an insurance company. See block 106 of FIG. 8. Based upon the second message, the computing device, such as the processing circuitry, the processor, the communication interface or the like, is configured to receive a second response from the second request processor. See block 108 of FIG. 8. In the context of an electronic healthcare message and, more particularly, a medical claim, the second response may provide an indication as to the coverage, if any, provided by the claims payor for the medication that is the subject of the medical claim. In an instance in which the second response indicates that coverage is not provided by a medical insurance plan of the patient, the second response may also provide an indication as to the reason for denial of the medical claim. Alternatively, in an instance in which the second response indicates that coverage is provided by a medical insurance plan of the patient, the second response may provide a reimbursement amount indicative of the monetary amount for which the pharmacy will be reimbursed by the claims payor in response to dispensation of the medication that is the subject of the medical claim and, in some embodiments, an indication of the patient's out-of-pocket may also be provided.

As shown in FIG. 8, after having received either the second type of the first response or the second response, the computing device 20 is configured to construct a response to the electronic message and to then cause the response to be transmitted to the source 12 of the electronic message. See blocks 100 and 102 of FIG. 8. As such, the source can receive information, such as feedback or the like, based upon the electronic message from the first or second request processors 70, 72.

In the context of an electronic healthcare message, in an instance in which the analysis of the first response indicates that the first response is of the second type in that the first response provides an indication that the medication or service that was the subject of the electronic healthcare message is properly the subject of a prescription claim and is covered by a prescription benefits plan, a prescription insurance plan or the like, the computing device of this example embodiment causes a response to the electronic healthcare message to be constructed and then transmitted to the source, such as a pharmacy management system, based upon the first response. In this instance, the response generally includes the information provided by the prescription claims processor, such as an indication as to whether the claims payor provides coverage for the prescription claim and, if so, the reimbursement amount associated therewith and optionally the patient's out-of-pocket costs.

However, in an instance in which the computing device 20 receives a second response, either following a determination that the first response is of a first type, such as a first response indicating that the prescription claim has been rejected, or an initial determination that the electronic message calls for a second action to be taken, the computing device of this example embodiment causes a response to the electronic healthcare message to be constructed and then transmitted to the source 12, such as the pharmacy management system, based upon the second response. In this instance, the response generally includes the information provided by the medical claims processor, such as an indication as to whether the claims payor provides coverage for the medical claim and, if so, the reimbursement amount associated therewith and optionally the patient's out-of-pocket costs.

The source 12, such as the pharmacy management system, is therefore provided with the response that includes the information provided by the first or second request processors 70, 72. In an instance in which the response is constructed from the first response, the source is provided with information from the first request processor, such as a prescription claims processor. Thus, the response in this instance provides an indication as to whether the claims payor provides coverage for the prescription claim and, if so, the reimbursement amount for the prescription claim. Conversely, in an instance in which the response is constructed from the second response, the source is provided with information from the second request processor, such as a medical claims processor. Thus, the response in this instance provides an indication as to whether the claims payor provides coverage for the medical claim and, if so, the reimbursement amount for the medical claim. Based upon the response to the electronic healthcare message provided by the service provider 14, a pharmacist may proceed to dispense the medication that is the subject of the prescription in an instance in which the pharmacy is to be fully reimbursed by the claims payor or may counsel the patient as to the out-of-pocket amount that the payor must personally pay prior to dispensing the medication in an instance in which the reimbursement amount is less than the full cost of the medication.

As shown in block 110 and regardless of whether the first action or the second action was taken, the computing device 20, such as the processing circuitry 22, the processor 24, the database 30 or the like, is also configured to store one or more of the electronic message, the first message to the first request processor 70, the first response from the first request processor, the second message to the second request processor 72, the second response from the second request processor and/or the response to the electronic message in the database. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

An example in which the method, computing device 20 and computer program product of an example embodiment parses an electronic message, such as an electronic healthcare message, and construct differently prioritized messages therefrom is depicted in FIG. 9. In this example embodiment and as shown by signal flow 1, the service provider 14 receives an electronic message, such as an electronic healthcare message, from a source 12, such as a pharmacy management system of a pharmacy. The computing device of the service provider, such as the processing circuitry 22, the processor 24 of the like, parses the electronic message to separately identify first and second differently formatted portions and then analyzes the electronic message to identify an action to be taken. For example, based upon a qualifier field 64 of the electronic message, the computing device of the service provider may determine whether the electronic healthcare message is to be processed as a prescription claim, at least initially, or is to be processed as a medical claim.

In an instance in which the electronic healthcare message is determined to present a prescription claim, the service provider 14 constructs a first message based on the first portion of the electronic message and transmits the first message to a first request processor 70, such as a prescription claims processor, for adjudication of the prescription claim, such as a prescription reimbursement request or a predetermination of prescription benefits request. See signal flow 2 of FIG. 9. The service provider then receives a first response from the first request processor providing the results of the adjudication of the prescription claim, such as the coverage provided for the medication, as shown in signal flow 3 of FIG. 9. In an instance in which an analysis of the first response indicates that the electronic healthcare message was properly adjudicated as a prescription claim as a result of coverage being provided by the prescription benefits plan or prescription insurance plan of the patient, the service provider may then provide a response to the electronic message to the source 12, such as the pharmacy management system, based upon the first response from the first request processor. See signal flow 6 of FIG. 9. As such, in the context of a prescription claim, such as a prescription reimbursement request or a predetermination of prescription benefits request, the source, such as the pharmacy management system, is provided with information indicative of the coverage provided to the patient for the medication pursuant to the prescription benefit plan or the prescription insurance plan of the patient.

In contrast, either in an instance in which the initial analysis of the electronic healthcare message, such as the qualifier field 64 of the electronic healthcare message, indicates that the electronic healthcare message relates to a medical claim or in an instance in which the first response from the first request processor 70 indicates that the prescription claim is rejected, the service provider 14 treats the electronic healthcare message as a medical claim, constructs a second message based at least on the second portion of the electronic message and transmits the second message to a second request processor 72, such as a medical claims processor, for adjudication of the medical claim, such as a medical reimbursement request or a predetermination of medical benefits request. See signal flow 4 of FIG. 9. The service provider then receives a second response from the second request processor providing the results of the adjudication of the medical claim, such as the coverage provided for the medication by the medical insurance plan of the patient, as shown in signal flow 5 of FIG. 9. The service provider may then provide a response to the electronic message to the source 12, such as the pharmacy management system, based upon the second response from the second request processor. See signal flow 6 of FIG. 9. As such, in the context of a medical claim, such as a medical reimbursement request or a predetermination of medical benefits request, the source, such as the pharmacy management system, is provided with information indicative of the coverage provided to the patient for the medication pursuant to the medical insurance plan of the patient.

Thus, the computing device 20 of this example embodiment increases the efficiency with which prescription claims and medical claims are evaluated. In this regard, in an instance in which a source 12, such as a pharmacy management system, is unable to determine whether coverage would be provided for a medication, such as a specialty medication, by the patient's prescription benefits plan or prescription insurance plan on the one hand and the patient's medical insurance plan on the other hand, the computing device is responsive to a single message to adjudicate the claim first as a prescription claim and then, in unsuccessful, as a medical claim. Thus, in an instance in which the prescription claim is rejected, the computing device is configured to permit a medical claim for the same medication or service that was the subject of the prescription claim to be adjudicated without interaction with the source at the time of adjudication, thereby reducing message traffic and increasing the speed with which responses to medical claims may be provided to a pharmacy. As such, a pharmacy can respond to patients more quickly, such as in real time or near real time, not only to prescription claims, but also to medical claims in an instance in which the pharmacy was not aware, at least not initially, as to the type of claim to be submitted for the medication or service.

As noted above, FIGS. 3 and 8 are flowcharts illustrating the operations performed by a method, apparatus and computer program product, such as computing device 20 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of a computing device employing an embodiment of the present invention and executed by processing circuitry 22, e.g., a processor 24, of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 8, when executed, convert a computer or processing circuitry into a particular machine configured to perform an example embodiment of the present invention. Accordingly, the operations of FIGS. 3 and 8 define algorithms for configuring a computer or processing circuitry, e.g., processor, to perform an example embodiment. In some cases, a general purpose computer may be provided with an instance of the processor which performs the algorithms of FIGS. 3 and 8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. For example, although the service provider 14 that embodies the computing device 20 is described to be a switch, the service provider and/or the computing device may be embodied by other entities, such as a pharmacy benefits manager (PBM), in other embodiments. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to parse and differently process different portions of an electronic healthcare message, the computing device comprising:

processing circuitry configured to:

parse the electronic healthcare message to separately identify first and second portions, wherein the first portion is formatted in accordance with a first predefined format and the second portion is formatted differently than the first portion, and wherein the first predefined format is in accordance with a standard associated with submission of prescription claim requests;

analyze the second portion of the electronic healthcare message to identify (i) an action to be taken based thereupon, (ii) a cost paid by a pharmacy for a medication associated with the electronic healthcare message, and (iii) whether information associated with a medical claim is included within the second portion;

construct a first message in the form of a prescription claim request formatted in accordance with the first predefined format based upon the first portion and not the second portion to be transmitted to a prescription claims processor;

based upon the first message including the first portion formatted in accordance with the first predefined format, receive a first response comprising a reimbursement amount for the medication associated with the electronic healthcare message from the prescription claims processor;

in accordance with a determination that the cost paid by the pharmacy for the medication exceeds the reimbursement amount, construct a response to the electronic healthcare message that includes a rejection of the prescription claim request for transmission to the pharmacy and construct a reversal message to be transmitted by the computing device to the prescription claims processor to cause the medication to be eliminated from the prescription claim request without reliance upon analysis by the pharmacy of the reimbursement amount; and in an instance in which the analysis of the second portion of the electronic healthcare message identifies information associated with a medical claim included within the second portion, (i) construct a second message in the form of a medical claim request in a second predefined format, different than the first predefined format, from the information associated with the medical claim included within the second portion to be transmitted to a medical claims processor different than the prescription claims processor and different than a source of the electronic healthcare message such that first and second different messages are both separately constructed from separate respective portions of a single electronic message; (ii) based upon the second message, receive a second response from the medical claims processor; and (iii) based upon the second response from the medical claims processor, construct a response to the electronic healthcare message that is to be transmitted.

2. A computing device according to claim 1 wherein, in an instance in which the cost paid by the pharmacy for the medication exceeds the reimbursement amount, the processing circuitry is configured to construct the response to the electronic healthcare message by modifying the response from an indication that the prescription claim will be paid at the reimbursement amount to an indication that the prescription claim is rejected.

3. A computing device according to claim 1 wherein the processing circuitry is configured to parse the electronic healthcare message by parsing the electronic healthcare message to identify a qualifier indicative of a presence of the second portion within the electronic healthcare message, a presence of the first portion within the electronic healthcare message, and whether the first portion is formatted in accordance with the standard associated with submission of prescription claim requests.

4. A computing device according to claim 1 wherein the processing circuitry is configured to analyze the second portion of the electronic healthcare message by identifying a system edit instruction, and wherein the processing circuitry is configured to construct the first message to be transmitted to the prescription claims processor by modifying the first portion as to include additional information associated with a medical patient in accordance with the system edit instruction prior to transmitting the first message to the prescription claims processor.

5. A computing device according to claim 1 wherein the processing circuitry is further configured to identify a document to be provided, and wherein the processing circuitry is configured to construct the response to the electronic healthcare message that is provided based upon information from the first or second portion of the electronic healthcare message, the first response from the prescription claims processor or the second response from the medical claims processor to include an access mechanism that is accessible in order to retrieve the document.

6. A computing device according to claim 5 wherein the document to be provided is stored, and wherein the processing circuitry is configured to control access to the document and to maintain a record of access to the document.

7. A computing device according to claim 1 wherein the processing circuitry is configured to analyze the second portion of the electronic healthcare message to identify a role indicator, and wherein the action to be taken is based upon the role indicator.

8. A computing device according to claim 7 wherein the processing circuitry is configured to condition transmission of the first message to the prescription claims processor or provision of the response to the electronic healthcare message upon the role indicator having a predefined value.

9. A method for parsing and differently processing different portions of an electronic healthcare message, the method comprising:

receiving the electronic healthcare message comprising a;

parsing the electronic healthcare message to separately identify first and second portions, wherein the first portion is formatted in accordance with a first predefined format and the second portion is formatted differently than the first portion, and wherein the first predefined format is in accordance with a standard associated with submission of prescription claim requests;

analyzing the second portion of the electronic healthcare message to identify (i) an action to be taken based thereupon, (ii) a cost paid by a pharmacy for a medication associated with the electronic healthcare message, and (iii) whether information associated with a medical claim is included within the second portion;

constructing a first message in the form of a prescription claim request formatted in accordance with the first predefined format based upon the first portion and not the second portion to be transmitted to a prescription claims processor;

based upon the first message including the first portion formatted in accordance with the first predefined format, receiving a first response comprising a reimbursement amount for the medication associated with the electronic healthcare message from the prescription claims processor;

in accordance with a determination that the cost paid by the pharmacy for the medication exceeds the reimbursement amount, constructing a response to the electronic healthcare message that includes a rejection of the prescription claim request for transmission to the pharmacy and constructing a reversal message to be transmitted by the computing device to the prescription claims processor to cause the medication to be eliminated from the prescription claim request without reliance upon analysis by the pharmacy of the reimbursement amount; and in an instance in which the analysis of the second portion of the electronic healthcare message identifies information associated with a medical claim included within the second portion, (i) constructing a second message in the form of a medical claim request in a second predefined format, different than the first predefined format, from the information associated with the medical claim included within the second portion to be transmitted to a medical claims processor different than the prescription claims processor and different than a source of the electronic healthcare message such that first and second different messages are both separately constructed from separate respective portions of a single electronic healthcare message; (ii) based upon the second message, receiving a second response from the medical claims processor; and (iii) based upon the second response from the medical claims processor, constructing a response to the electronic healthcare message that is to be transmitted.

10. A method according to claim 9 wherein, in an instance in which the cost paid by the pharmacy for the medication exceeds the reimbursement amount, constructing the response to the electronic healthcare message comprises modifying the response from an indication that the prescription claim will be paid at the reimbursement amount to an indication that the prescription claim is rejected.

11. A method according to claim 9 wherein parsing the electronic healthcare message comprises parsing the electronic healthcare message to identify a qualifier indicative of a presence of the second portion within the electronic healthcare message, a presence of the first portion within the electronic healthcare message, and whether the first portion is formatted in accordance with the standard associated with submission of prescription claim requests.

12. A method according to claim 9 wherein analyzing the second portion of the electronic healthcare message comprises identifying a system edit instruction, and wherein constructing the first message to be transmitted to the prescription claims processor comprises modifying the first portion as to include additional information associated with a medical patient in accordance with the system edit instruction prior to transmitting the first message to the prescription claims processor.

13. A method according to claim 9 further comprising identifying a document to be provided, and wherein constructing the response to the electronic healthcare message to be provided is based upon information from the first or second portion of the electronic healthcare message, the first response from the prescription claims processor or the second response from the medical claims processor and comprises including an access mechanism that is accessible in the response in order to permit the document to be retrieved using the access mechanism.

14. A method according to claim 13 wherein the document to be provided is stored, and wherein the method further comprises controlling access to the document and maintaining a record of access to the document.

15. A method according to claim 9 wherein analyzing the second portion of the electronic healthcare message comprises identifying a role indicator, and wherein the action to be taken is based upon the role indicator.

16. A method according to claim 15 further comprising conditioning transmission of the first message to the prescription claims processor or provision of the response to the electronic healthcare message upon the role indicator having a predefined value.

17. A computer program product configured to parse and differently process different portions of an electronic healthcare message, the computer program product comprising a non-transitory computer readable medium having program code stored thereon, the program code comprising program code instructions configured, upon execution, to:
parse the electronic healthcare message to separately identify first and second portions, wherein the first portion is formatted in accordance with a first predefined format and the second portion is formatted differently than the first portion, and wherein the first predefined format is in accordance with a standard associated with submission of prescription claim requests;
analyze the second portion of the electronic healthcare message to identify (i) an action to be taken based thereupon, (ii) a cost paid by a pharmacy for a medication associated with the electronic healthcare message, and (iii) whether information associated with a medical claim is included within the second portion;
construct a first message in the form of a prescription claim request formatted in accordance with the first predefined format based upon the first portion formatted and not the second portion to be transmitted to a prescription claims processor;
based upon the first message including the first portion formatted in accordance with the first predefined format, receive a first response comprising a reimbursement amount for the medication associated with the electronic healthcare message from the prescription claims processor;
in accordance with a determination that the cost paid by the pharmacy for the medication exceeds the reimbursement amount, construct a response to the electronic healthcare message that includes a rejection of the prescription claim request for transmission to the pharmacy and construct a reversal message to be transmitted by the computing device to the prescription claims processor to cause the medication to be eliminated from the prescription claim request without reliance upon analysis by the pharmacy of the reimbursement amount; and
in an instance in which the analysis of the second portion of the electronic healthcare message identifies information associated with a medical claim included within the second portion, (i) construct a second message in the form of a medical claim request in a second predefined format, different than the first predefined format, from the information associated with the medical claim included within the second portion to be transmitted to a medical claims processor different than the prescription claims processor and different than a source of the electronic healthcare message such that first and second different messages are both separately constructed from separate respective portions of a single electronic healthcare message; (ii) based upon the second message, receive a second response from the medical claims processor; and (iii) based upon the second response from the medical claims processor, construct a response to the electronic healthcare message that is to be transmitted.

18. A computer program product according to claim 17 wherein the program code instructions configured to construct the response to the electronic health message in an instance in which the cost paid by the pharmacy for the medication exceeds the reimbursement amount comprise program code instructions configured to modify the response from an indication that the prescription claim will be paid at the reimbursement amount to an indication that the prescription claim is rejected.

19. A computer program product according to claim 17 wherein the program code instructions configured to parse the electronic healthcare message comprise program code instructions configured to parse the electronic healthcare message to identify a qualifier indicative of a presence of the second portion within the electronic healthcare message, a presence of the first portion within the electronic healthcare message, and whether the first portion is formatted in accordance with the standard associated with submission of prescription claim requests.

20. A computer program product according to claim 17 wherein the program code instructions configured to analyze the second portion of the electronic healthcare message comprise program code instructions configured to identify a system edit instruction, and wherein the program code instructions configured to construct the first message to be transmitted to the prescription claims processor comprise program code instructions configured to modify the first portion as to include additional information associated with a medical patient in accordance with the system edit instruction prior to transmitting the first message to the prescription claims processor.

* * * * *

UNITED STATES PATENT AND TRADEMARK OFFICE
CERTIFICATE OF CORRECTION

PATENT NO. : 11,398,992 B1
APPLICATION NO. : 17/219526
DATED : July 26, 2022
INVENTOR(S) : Frechen et al.

It is certified that error appears in the above-identified patent and that said Letters Patent is hereby corrected as shown below:

In the Claims

Column 30,
Line 12, "receiving the electronic healthcare message comprising a" should read --receiving the electronic healthcare message--.

Signed and Sealed this
Twenty-second Day of August, 2023

Katherine Kelly Vidal
*Director of the United States Patent and Trademark Office*